(12) United States Patent
Ren et al.

(10) Patent No.: US 9,524,092 B2
(45) Date of Patent: Dec. 20, 2016

(54) DISPLAY MODE SELECTION ACCORDING TO A USER PROFILE OR A HIERARCHY OF CRITERIA

(71) Applicant: Pixtronix, Inc., San Diego, CA (US)

(72) Inventors: Xia Ren, Tempe, AZ (US); Sriram Akella, Hyderabad, IN (US); Matthew Brian Sampsell, San Jose, CA (US); Wilhelmus Adrianus De Groot, Palo Alto, CA (US); Jennifer Lee Gille, Menlo Park, CA (US); Thomas Gerald Fiske, Campbell, CA (US); Gianni Taraschi, Arlington, MA (US); Theodore Richard Santos, II, Boulder, CO (US); Gregory Paul Heinzinger, Del Mar, CA (US); Shiae Shin Park, San Diego, CA (US); Mark Jerger, San Diego, CA (US); Mark Douglas Halfman, Newtonville, MA (US); Brian Finkel, Acton, MA (US); Jonathan Karl Kies, Encinitas, CA (US)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 14/723,164

(22) Filed: May 27, 2015

(65) Prior Publication Data

US 2015/0346987 A1 Dec. 3, 2015

Related U.S. Application Data

(60) Provisional application No. 62/139,542, filed on Mar. 27, 2015, provisional application No. 62/005,901, filed on May 30, 2014.

(51) Int. Cl.
*G09G 3/34* (2006.01)
*G09G 5/02* (2006.01)
(Continued)

(52) U.S. Cl.
CPC ......... *G06F 3/04847* (2013.01); *G06F 1/1626* (2013.01); *G06F 1/32* (2013.01);
(Continued)

(58) Field of Classification Search
CPC combination set(s) only.
See application file for complete search history.

(56) References Cited

U.S. PATENT DOCUMENTS 5,886,689 A    3/1999 Chee et al.
6,411,306 B1   6/2002 Miller et al.
(Continued)

OTHER PUBLICATIONS

International Search Report and Written Opinion—PCT/US2015/033050—ISA/EPO—Sep. 30, 2015.

*Primary Examiner* — Wesner Sajous
(74) *Attorney, Agent, or Firm* — Weaver Austin Villeneuve & Sampson LLP

(57) ABSTRACT

Some implementations provide automatic display mode selection for a device, such as a mobile display device, according to a hierarchy of criteria. Each display mode may correspond with a set of display parameter settings, which may include a color depth setting, a brightness setting, etc. In some examples, one of the criteria may correspond with a software application being executed on the device. Some implementations involve creating a display device user profile and controlling a display of a mobile display device according to the user profile. The user profile may be built gradually over some number of days/weeks/months after the first use of the device. In some implementations, display parameter setting information or other device setting information corresponding to data in a user profile, including but not limited to demographic data, may be received by a mobile display device from another device, such as a server.

26 Claims, 18 Drawing Sheets

(51) Int. Cl.
  *G06F 3/048* (2013.01)
  *G06F 1/32* (2006.01)
  *G06F 3/0484* (2013.01)
  *G06F 17/30* (2006.01)
  *G06F 3/0482* (2013.01)
  *G06F 3/0489* (2013.01)
  *G06F 1/16* (2006.01)
  *H04W 4/00* (2009.01)
  *H04W 52/02* (2009.01)

(52) U.S. Cl.
  CPC .......... *G06F 1/3265* (2013.01); *G06F 3/0482* (2013.01); *G06F 3/04897* (2013.01); *G06F 17/30702* (2013.01); *G09G 3/3406* (2013.01); *H04W 4/001* (2013.01); *H04W 52/0209* (2013.01); *G06F 2203/04808* (2013.01); *G09G 2320/0271* (2013.01); *G09G 2320/0633* (2013.01)

(56) References Cited

U.S. PATENT DOCUMENTS

| | | | |
|---|---|---|---|
| 6,731,274 B2 | 5/2004 | Powell | |
| 8,423,803 B2 | 4/2013 | Brown et al. | |
| 8,621,251 B1 | 12/2013 | Keller et al. | |
| 8,665,307 B2 * | 3/2014 | Setton | H04N 7/147 345/419 |
| 2003/0214458 A1 | 11/2003 | Giemborek et al. | |
| 2005/0128192 A1 | 6/2005 | Heintzman et al. | |
| 2009/0133090 A1 * | 5/2009 | Busse | H04N 7/163 725/132 |
| 2011/0109613 A1 * | 5/2011 | Asai | G06F 1/28 345/211 |
| 2011/0148930 A1 | 6/2011 | Lee et al. | |
| 2012/0060024 A1 | 3/2012 | Jackson et al. | |
| 2012/0197973 A1 | 8/2012 | Tukol et al. | |
| 2012/0260287 A1 * | 10/2012 | Yeh | H04N 21/4314 725/39 |
| 2012/0260683 A1 | 10/2012 | Cheon et al. | |
| 2012/0262477 A1 * | 10/2012 | Buchheit | G09G 5/00 345/619 |
| 2013/0106684 A1 * | 5/2013 | Weast | G06F 19/3481 345/156 |
| 2013/0257849 A1 | 10/2013 | Doherty et al. | |
| 2014/0176450 A1 | 6/2014 | Chang | |
| 2014/0351721 A1 * | 11/2014 | Deluca | G06F 9/4443 715/760 |
| 2014/0365304 A1 * | 12/2014 | Showers | G06Q 30/02 705/14.55 |
| 2015/0070337 A1 * | 3/2015 | Bell | G09G 3/2003 345/207 |
| 2016/0019834 A1 | 1/2016 | Hall | |

* cited by examiner

DISPLAY MODE SELECTION ACCORDING TO A USER PROFILE OR A HIERARCHY OF CRITERIA

CROSS REFERENCE TO RELATED APPLICATIONS

This application claims the benefit of priority under 35 U.S.C. §119(e) to U.S. Provisional Patent Application No. 62/005,901, filed on May 30, 2014, and to U.S. Provisional Patent Application No. 62/139,542, filed on Mar. 27, 2015, both of which applications are hereby incorporated by reference herein in their entireties and for all purposes.

TECHNICAL FIELD

This disclosure relates generally to display devices and related methods, particularly to devices and methods applicable to mobile display devices.

DESCRIPTION OF THE RELATED TECHNOLOGY

As used herein, the term "mobile display device" may refer to one of various devices, including but not limited to mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, global positioning system (GPS) receivers/navigators, digital media players, wrist watches, clocks, electronic reading devices, mobile health devices that include displays, etc. In some implementations, the digital media players may be Moving Picture Experts Group Audio Layer III (MP3) players. According to some examples, the electronic reading devices may be e-readers.

Display device settings, including but not limited to display settings of mobile display devices, may be difficult for a user to optimize. For example, some displays of mobile display devices may be operated according to various user-selectable display modes, but many users may find it challenging to select the proper mode for a given situation. Moreover, the display modes are generally made the same for all users.

SUMMARY

The systems, methods and devices of the disclosure each have several innovative aspects, no single one of which is solely responsible for the desirable attributes disclosed herein.

One innovative aspect of the subject matter described in this disclosure can be implemented in a method that involves controlling a mobile display device to provide at least one prompt for preference data, including at least one prompt for a selection among multiple scenarios involving trade-offs between display parameter settings and corresponding power consumption levels. The method may involve receiving the preference data via the mobile display device and adding the preference data to a profile. In some implementations, the preference data can be associated with a user profile. In some examples, the method may involve controlling a display of the mobile display device, at least in part, according to the profile.

According to some implementations, the display parameter settings may include color depth settings. Each of the color depth settings may correspond to a number of bits used to specify a color depth setting.

In some examples, the method may involve controlling the display of the mobile display device to provide at least one prompt for a visual performance test. The method may involve receiving visual performance data, responsive to the at least one prompt, via the mobile display device. The method may involve adding the visual performance data to the profile. According to some implementations, the visual performance test may involve testing for at least one acuity type, such as color brightness acuity or dithering technique acuity.

In some examples, the method may involve controlling the mobile display device to provide at least one prompt regarding demographic information. The method may involve receiving demographic information, responsive to the at least one prompt, via the mobile display device and transmitting, via a network interface of the mobile display device, the demographic information to an apparatus. The method may involve receiving, from the apparatus and via the network interface of the mobile display device, default display parameter setting information corresponding to the demographic information and adding the default display parameter setting information to the profile.

According to some examples, adding information to the profile may involve transmitting, via a network interface of the mobile display device, profile information to a server. In some examples, the method may involve receiving, via a network interface of the mobile display device, profile information from a server.

Some implementations may involve controlling the display of the mobile display device according to a hierarchy of criteria. In some examples, the hierarchy of criteria may include battery state, luminance of ambient light, or ambient temperature.

According to some implementations, the method may involve determining a software application that is currently being executed by the mobile display device and controlling the display of the mobile display device based, at least in part, on the software application. In some examples, the method may involve determining that a plurality of software applications is currently being executed by the mobile display device and determining a display mode for the display of the mobile display device based, at least in part, on a hierarchy of display modes.

Some innovative aspects of the subject matter described in this disclosure can be implemented in an apparatus. In some examples, the apparatus may be a mobile display device that includes a display, a user interface system and a control system. According to some implementations, the control system may be capable of controlling the display to provide at least one prompt for preference data, including at least one prompt for a selection among multiple scenarios involving trade-offs between display parameter settings and corresponding power consumption levels. In some examples, the control system may be capable of receiving the preference data via the user interface system, adding the preference data to a profile and controlling the display, at least in part, according to the profile. In some examples, the profile may be a user profile.

According to some implementations, the control system may be capable of controlling the display to provide at least one prompt for a visual performance test. The control system may be capable of receiving visual performance data responsive to the at least one prompt and adding the visual performance data to the profile.

In some examples, the control system may be capable of controlling the mobile display device to enter a battery saving mode based at least in part on the visual performance data. According to some implementations, the control system may be capable of controlling the mobile display device to enter a visually compensatory mode based on the visual performance data. In some examples, the control system may be capable of controlling the mobile display device to enter a battery saving mode based at least in part on the preference data.

According to some implementations, the mobile display device may include a network interface. The control system may be capable of controlling the mobile display device to provide at least one prompt regarding demographic information and of receiving demographic information, responsive to the at least one prompt, via the user interface system. In some examples, the control system may be capable of transmitting, via the network interface, the demographic information to an apparatus. The control system may be capable of receiving, from the apparatus and via the network interface of the mobile display device, default display parameter setting information corresponding to the demographic information. The control system may be capable of adding the default display parameter setting information to the profile.

According to some examples, the control system may be capable of transmitting, via the network interface, preference data to an apparatus. The control system may be capable of receiving, from the apparatus and via the network interface, display parameter setting information corresponding to the preference data. The control system may be capable of controlling the display according to the display parameter setting information.

In some examples, adding information to the profile may involve transmitting, via the network interface, profile information to a server. According to some implementations, the control system may be capable of receiving, via the network interface, profile information from a server.

According to some examples, the control system may be capable of controlling the display according to a hierarchy of criteria. The hierarchy of criteria may include one or more of battery state, luminance of ambient light, ambient temperature or information in the profile.

According to some implementations, the control system may be capable of determining a software application that is currently being executed by the mobile display device and controlling the display, at least in part, on the software application. In some examples, the control system may be capable of determining that a plurality of software applications is currently being executed by the mobile display device and determining a display mode for the display of the mobile display device based, at least in part, on a hierarchy of display modes.

Other innovative aspects of the subject matter described in this disclosure can be implemented in an apparatus. In some examples, the apparatus may include a network interface system and a control system. The control system may be capable of receiving demographic information, via the network interface, from a mobile display device. In some examples, the control system may be capable of determining default display parameter setting information corresponding to the demographic information, of adding the default display parameter setting information to a profile and of providing profile information corresponding to the profile, via the network interface, to the mobile display device. The profile information may, for example, include the default display parameter setting information.

According to some implementations, the control system may be capable of receiving preference data, via the network interface system, from a mobile display device, of determining display parameter setting information for the mobile display device corresponding to the preference data and of transmitting the display parameter setting information, via the network interface system, to the mobile display device. According to some examples, the control system may be capable of providing to the mobile display device, via the network interface system, a hierarchy of criteria for controlling a display of the mobile display device. In some examples, the hierarchy of criteria may include battery state, luminance of ambient light, or ambient temperature.

According to some examples, the control system may be capable of receiving, via the network interface system, an indication of a software application that is currently being executed by the mobile display device. The control system may be capable of transmitting, via the network interface system, information for controlling a display of the mobile display device based, at least in part, on the software application. According to some implementations, the control system may be capable of receiving, via the network interface system, an indication that a plurality of software applications is currently being executed by the mobile display device. In some examples, the control system may be capable of determining display mode information for controlling a display of the mobile display device based, at least in part, on a hierarchy of display modes and of transmitting, via the network interface system, the display mode information to the mobile display device.

Some or all of the methods described herein may be performed by one or more devices according to instructions stored on non-transitory media. In some implementations, the methods may be performed according to software. For example, the software may include instructions for controlling at least one device to determine at least one criterion of a hierarchy of criteria that includes a battery state of a mobile display device, a luminance of ambient light and ambient temperature and to select, based at least in part on the at least one criterion, a display mode from among a plurality of display modes for controlling a display of the mobile display device. In some implementations, the device can include a mobile display device, a wearable device, or a server. In some examples, each display mode may correspond with a set of display parameter settings. The display parameter settings may include a color depth setting selected from a plurality of color depth settings. According to some implementations, each display mode may indicate a display light illumination setting selected from plurality of display light illumination settings.

In some examples, determining the at least one criterion of the hierarchy of criteria may involve receiving battery state information for the mobile display device. The software may include instructions for controlling at least one device to determine whether the battery state information indicates that the battery has less than a power threshold level remaining and, if the battery state indicates that the battery has less than the power threshold level remaining, to select a black and white display mode for controlling the display. The power threshold level may, for example, be determined at least in part by information in the user profile.

According to some implementations, the software may include instructions for controlling at least one device to determine whether the battery state indicates that the battery has at least a power threshold level remaining and, if the battery state indicates that the battery has at least the power threshold level remaining, to determine an ambient light intensity level and to select a display mode for controlling the display based, at least in part, on the ambient light intensity level.

According to some examples, the software may include instructions for controlling at least one device to determine whether the ambient light intensity level is greater than an ambient light intensity level threshold and, if the ambient light intensity level is greater than the ambient light intensity level threshold, to select a beach display mode for controlling the display. In some implementations, the beach display mode may indicate a relatively high level of display light illumination and a relatively low color depth setting.

According to some implementations, the software may include instructions for controlling at least one device to determine whether the ambient light intensity level is greater than an ambient light intensity level threshold and, if the ambient light intensity level is not greater than the ambient light intensity level threshold, to determine an ambient temperature level and to select a display mode for controlling the display based, at least in part, on the ambient temperature level.

In some examples, the software may include instructions for controlling at least one device to determine whether the ambient temperature level is below an ambient temperature threshold and, if the ambient temperature level is below the ambient temperature threshold, to select a black and white display mode for controlling the display. According to some implementations, the software may include instructions for controlling at least one device to determine whether the ambient temperature level is within an ambient temperature range and, if the ambient temperature level is within the ambient temperature range, to select a balanced display mode for controlling the display. The balanced display mode may, for example, indicate a moderate level of display light illumination and a color depth setting in a low-to-moderate range of color depth settings.

According to some examples, the software may include instructions for selecting a default display mode for controlling the display if the ambient temperature level is not within the ambient temperature range. In some such examples, the default display mode may indicate a moderate level of display light illumination and a relatively high color depth setting.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
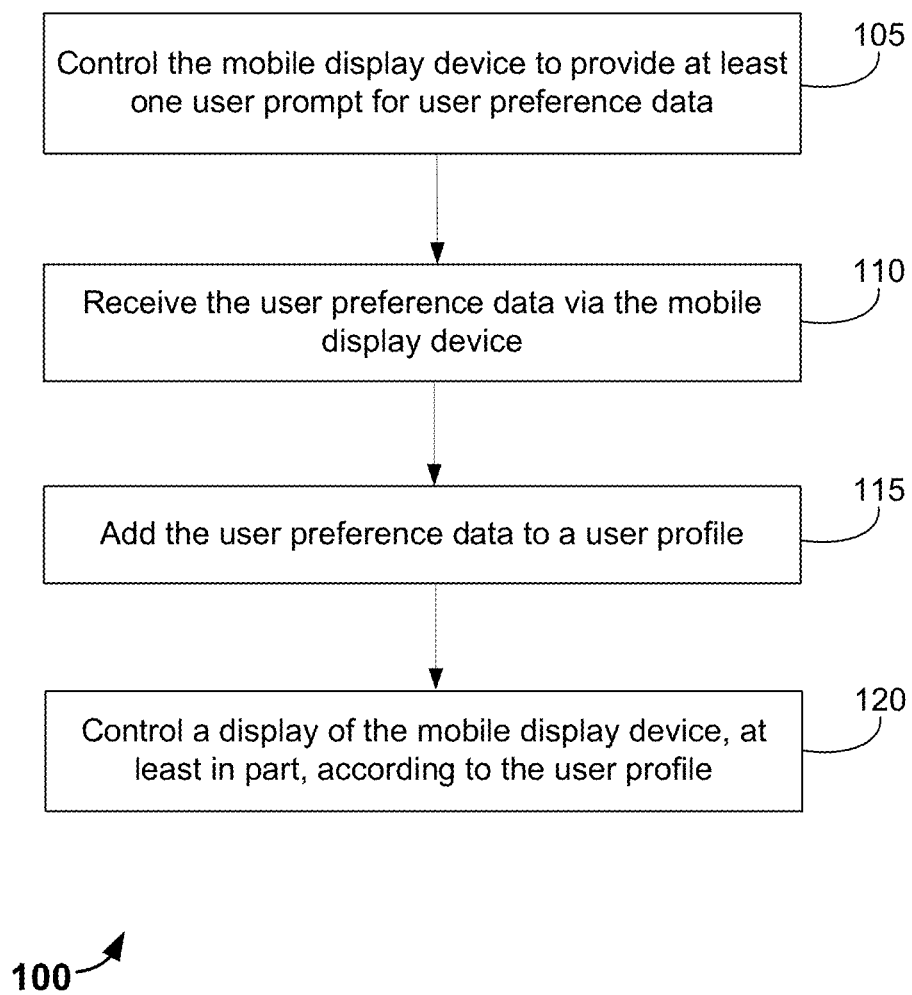
FIG. 1 is a flow diagram that outlines one example of a method of obtaining user preference data for customizing display settings of a mobile display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations provide automatic display mode selection according to a hierarchy of criteria. For example, such implementations may provide automatic display mode selection for a mobile display device. Each display mode may correspond with a set of display parameter settings, which may include a color depth setting, a brightness setting, a color gamut setting, a frame rate setting, a contrast setting, a gamma setting, etc. Some implementations may involve trade-offs between display parameter settings and power consumption. In some examples, one of the criteria may correspond with an application or "app" being executed on the display device. Various battery state conditions, ambient light conditions, etc., may correspond with a display mode. In some implementations, the display parameter setting information or other device setting information may be updated according to information received by a display device from another device, such as from a server.

In order to optimize display criteria for a particular user, some implementations may involve creating a user profile and controlling a display, such as a display of a mobile display device, according to the user profile. In some examples, the display criteria may include brightness, contrast, bit depth, resolution, color gamut, frame rate, power consumption or gamma. In some implementations, a user profile may be used to optimize other display device operations, such as audio performance, touch/gesture recognition, voice recognition, eye tracking, head tracking, etc. In some such examples, a user profile may be used to optimize the audio settings of a mobile display device, such as the volume, the relative amount of bass and treble, etc., according to a user's personal hearing profile. According to some examples, the user profile may be built gradually over some number of days/weeks/months after the first use of the device. In some implementations, display parameter setting information or other device setting information corresponding to data in a user profile may be received by a display device from another device, such as from a server. In some examples, the corresponding data in the user profile may include demographic data.

Particular implementations of the subject matter described in this disclosure can be implemented to realize one or more of the following potential advantages. Implementations that provide automatic display mode selection according to a hierarchy of criteria may provide a user with substantially optimized display settings and corresponding levels of power consumption for various scenarios, without requiring input from the user or requiring the user to understand how the display functions. Implementations involving a user profile may provide a further level of optimization according to the desires or characteristics of a particular user. In some implementations, default display parameter setting information may be determined according to known characteristics of a user's demographic and used to control a display without the need for related user input. Implementations that involve spreading out a process of constructing a user profile over a period of time can allow a detailed user profile to be constructed without overly burdening the user during the initial setup. For example, through a series of brief vision tests or A/B image prompts spread out over a period of time, which may include multiple uses of a mobile display device, multiple lighting and usage conditions, or multiple applications used, a substantial amount of information regarding a user's visual performance, including but not limited, to color perception, may be obtained via the display device without placing a significant burden on the user. In some implementations, the period of time may be multiple days, weeks or months. The visual performance information may be used to optimize the display's visual quality for the user. In some examples, the visual performance information may be used to increase brightness of colors that user has trouble perceiving. In some implementations, the visual performance information may be used to optimize the display power consumption, in order to reduce power spent on color depth that the user may not care about). Furthermore a substantial amount of information about the user's willingness to trade image quality for power may be obtained, which may allow further display power savings. In some examples, power may be expressed as battery life. Some user interfaces disclosed herein allow user information, including but not limited to information about the user's willingness to trade image quality for battery life, user preference information, visual performance information, etc., to be obtained conveniently.

As disclosed in more detail elsewhere herein, some methods may involve obtaining various types of user information for a user profile. Some implementations may involve providing user prompts for user information and obtaining user information responsive to the user prompts. Some such implementations may involve providing user prompts for user information via a mobile display device. For example, the user information may include user identification information, such as biometric information, a user name, user preference data, etc. In some implementations, user identification information may be used to associate user information with a particular user profile. It may be useful to distinguish user information obtained from multiple users of a single mobile display device, for example. Accordingly, user information may be organized in one or more data structures as according to user identification information, such as via a user identification code. According to some implementations, the data structures may be maintained by a mobile display device or by another device, such as a server. In some examples, user information may include demographic information, such as a user's age. Some implementations may involve obtaining information regarding a user's eye color, etc., such as according to user prompts or via a camera of the mobile display device. The user information may include health information, such as a user's eyeglass or contact lens prescription information, known color perception issues, known audio perception issues, etc. In some such examples, the user information may include a user's personal hearing profile. According to some such examples, a personal hearing profile may be obtained via a series of brief hearing tests or A/B audio prompts spread out over a period of time. In some implementations, the hearing tests may be presented during multiple uses of a mobile display device and multiple usage conditions, including but not limited to multiple background noise conditions. The personal hearing profile may be used to optimize the audio settings of a mobile display device, such as the volume, the relative amount of bass and treble, etc. Such information need not be obtained during the user's first time of using the mobile display device, but may be obtained over a period of hours, days, weeks, months or even years. According to some implementations, at least some such information may be obtained from another device, such as a server, a wearable device, or another display device.

Some user information may be obtained "passively," without the need for the user to respond to a prompt, enter information, etc. For example, some user information may be obtained according to how, when or where the mobile display device is used. Such user information may include the types of content provided by or applications executed on the mobile display device, user-selected settings for the mobile display device, mobile display device location information or the time of day during which the mobile display device is used, the environmental conditions in which the mobile display device is used, etc. In some examples, the user-selected settings for the mobile display device may include text size settings, brightness settings or audio volume settings. According to some implementations, the environmental conditions may include temperature or ambient light intensity. Like the user information obtained via user responses, information may be passively obtained over a period of time that may include many uses of the mobile display device.

Some implementations may allow a user to maintain multiple user profiles. For example, a user may normally have regular access to electrical outlets for charging a mobile display device. During such times, the user may want to have mobile display device settings controlled according to a first user profile that favors display image quality over battery life. However, the same user may spend time in places where there are few electrical outlets or no electrical outlets, such as wilderness areas, beach areas, etc. During the user's time in places with few or no charging options, the user may wish to have mobile display device settings controlled according to a second user profile that favors battery life over image quality. According to some implementations, a user may be able to select a user profile from among multiple user profiles by interacting with a graphical user interface. For example, each user profile may have a different name and may be presented in a different portion of a display. A user may select a desired user profile by touching a corresponding portion of the display.

FIG. 1 is a flow diagram that outlines one example of a method of obtaining user preference data for customizing display settings of a mobile display device. The blocks of method 100, like other methods described herein, are not necessarily performed in the order indicated. Moreover, such methods may include more or fewer blocks than shown or described.

In this implementation, block 105 involves controlling a mobile display device to provide at least one user prompt for user preference data. In this example, at least one user prompt is for a user's selection among multiple scenarios involving trade-offs between display parameter settings and corresponding power consumption levels. In some implementations, block 105 may involve a prompt such as those shown in FIGS. 2A-2C, which are described below. The trade-offs between display parameter settings and corresponding power consumption levels may allow a user to strike a personalized balance between a user's viewing experience and desired battery life. Such trade-offs may allow the device to preserve battery life to the extent feasible, while minimizing the impact on user experience of power-saving measures.

In some implementations the display parameter settings may include color depth settings. Each of the color depth settings may correspond to a number of bits used to specify a color depth setting. In some examples, the color depth setting may be 8 bits, 18 bits, 20 bits, 24 bits, 30 bits, or more than 30 bits. Some users may be willing to accept a relatively shorter battery life in order to have the experience of viewing a display that provides high color depth. For example, such a user may be willing to accept a relatively shorter battery life in order to experience the color depth provided by a 24-bit color depth setting or a 30-bit color depth setting, even if the user is informed that an 8-bit color depth setting or a 18-bit color depth setting would extend battery life. Similarly, some users may be willing to accept a relatively shorter battery life in order to have the experience of viewing a very bright display.

Other users may prefer to have a relatively longer battery life, even if the corresponding display parameter settings provide a relatively less-satisfying visual experience. For example, such users may be willing to accept an 8-bit color depth setting instead of an 18-bit or a 24-bit color depth setting in order to extend battery life.

Here, block 110 involves receiving the user preference data via the mobile display device. Block 110 may, for example, involve receiving the user preference data via a user interface system of the mobile display device, which may include a touch or gesture sensor system, a microphone for receiving voice commands and associated voice recognition software, hardware or firmware, one or more buttons or keys, etc.

In this example, block 115 involves adding the user preference data to a user profile. In some such implementations, block 115 may involve creating or updating a locally-maintained user profile, such as a user profile stored on a memory of the mobile display device. Alternatively, or additionally, block 115 may involve transmitting, via a network interface of the mobile display device, user profile information to another device. For example, the other device may be a server that is capable of creating or updating a user profile.

In this implementation, block 120 involves controlling a display of the mobile display device, at least in part, according to the user profile. For example, block 120 may involve controlling the display, at least in part, according to display parameter settings corresponding to the user preference data obtained in block 110.

Figure 2A:
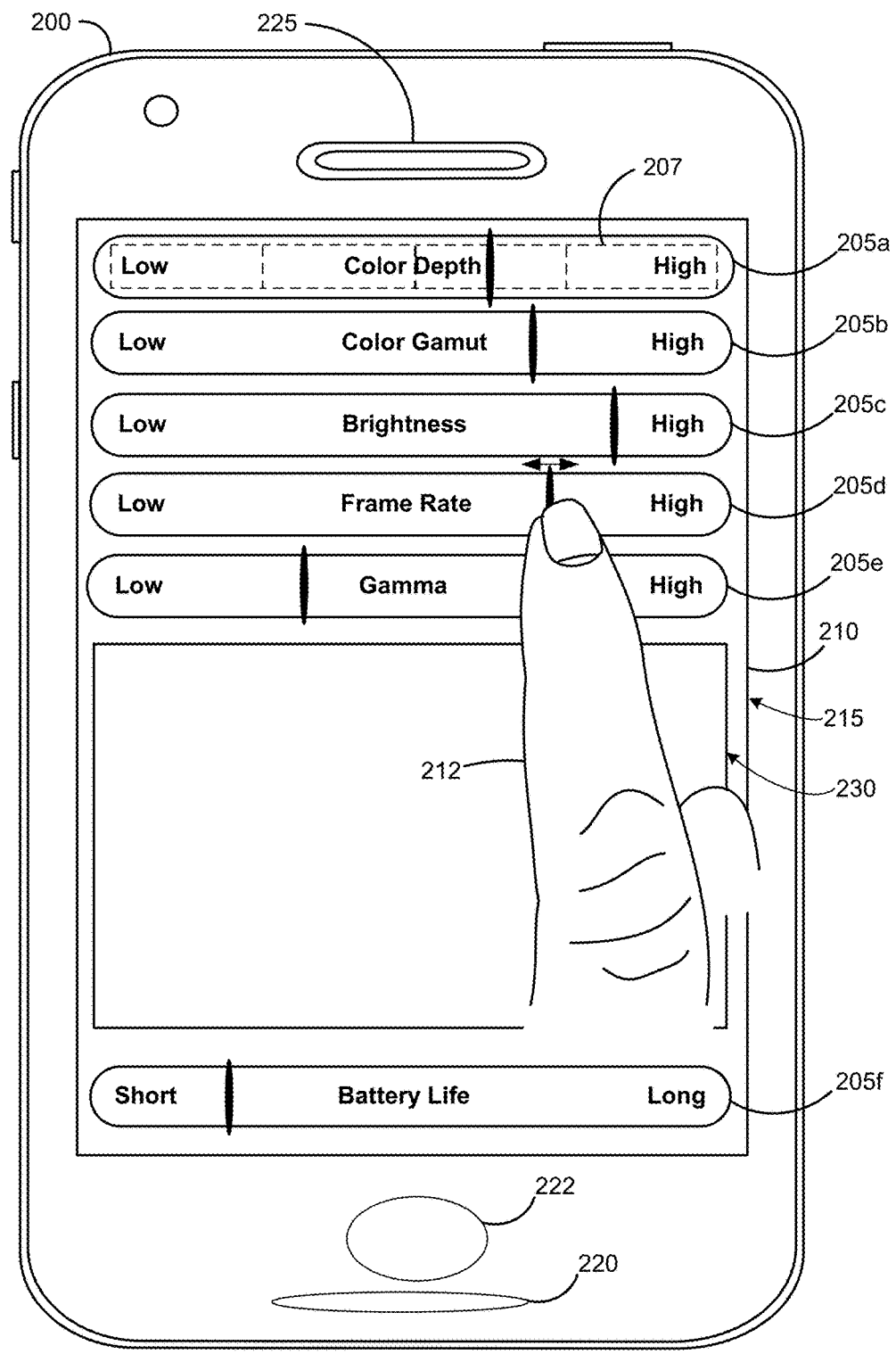
FIG. 2A shows examples of user prompts for a user's selection among multiple scenarios involving trade-offs between display parameter settings and corresponding power consumption levels.

FIG. 2A shows examples of user prompts for a user's selection among multiple scenarios involving trade-offs between display parameter settings and corresponding power consumption levels. In the example shown in FIG. 2A, the mobile display device 200 includes a display 210 and an overlying touch screen 215 of a touch sensor system.

In this example, slider bars 205a-205f are being presented on the display 210. Here, a user may interact with slider bars 205a-205e to indicate desired display parameter settings and the corresponding power consumption level is automatically indicated via slider bar 205f. In this example, a user's finger 212 is shown interacting with the slider bar 205d.

In this implementation, area 230 of the display 210 may indicate an image, a video, etc., controlled according to the display parameter settings selected by the user via the slider bars 205a-205e. In this way, the user can interactively evaluate both the visual characteristics of the displayed image(s) corresponding with the selected display parameter settings, as well as the overall effect on power consumption/battery life.

In some implementations, visual prompts may be presented on the display 210, such as prompts to interact with the slider bars 205a-205e, to evaluate the changes in the displayed image(s), etc. In some implementations, audio prompts may be made, such as via speaker 225 or by an audio feed to a user's ear buds. Commentary also may be provided in audio or video form, such as commentary regarding the relative power consumption of various display parameter settings, estimates of how many hours a device could be used for various purposes before recharging according to currently-selected display settings, etc. In some examples, the commentary may involve estimates of how many hours a device could be used for texting, word processing, a fitness-based application, watching video, playing games, etc.

The slider bars may or may not actually represent a continuous range of display parameter settings. In this example, the slider bar 205a only allows a user to select between four different color depth settings, each of the four color depth settings corresponding to one of the regions 207. However, the slider bar 205c may allow a user to select from a continuous range of display brightness settings.

In some implementations, a user may be able to select a desired combination of display parameter settings via the touch screen 215, such as by interacting with a button or other graphical user interface feature presented on the display 210. Alternatively, or additionally, a user may be able to select a desired combination of display parameter settings by pressing the button 222, by making a voice command that is received by the microphone 220, etc. The corresponding user preference data may be added to a user profile.

In some implementations, the user prompts of FIG. 2A may be presented on a mobile display device during a set-up process, which may be the first time that a particular user interacts with the mobile display device 200. However, such user prompts are not necessarily presented during a set-up process. As noted above, it may be advantageous to obtain user information for a user profile over a period of time that may encompass multiple uses of a mobile display device 200. According to some such implementations, at least some prompts may be made in response to environmental conditions, such as ambient light conditions, that are detected for the first time when a particular user is using a mobile display device 200.

Figure 2B:
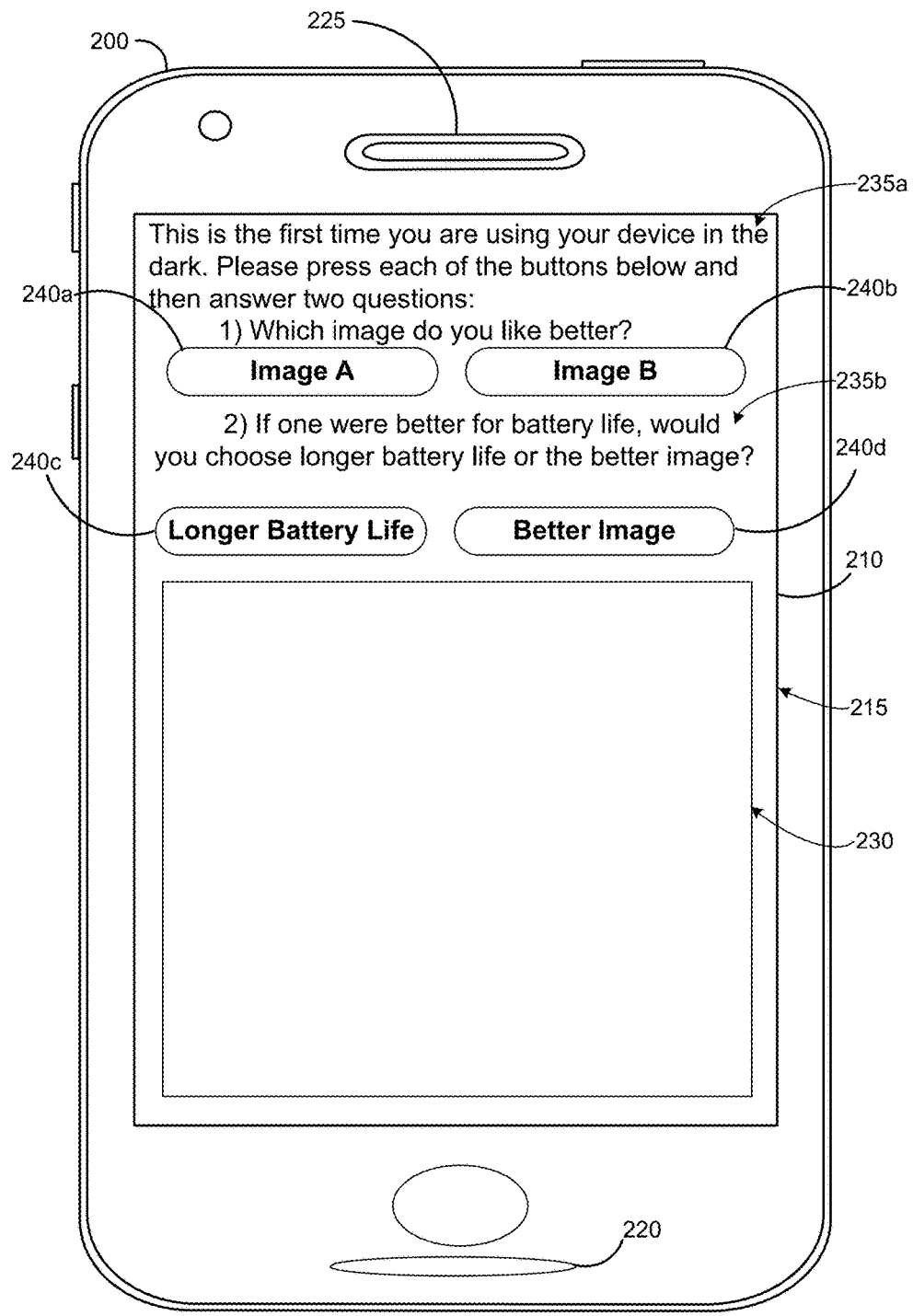
FIG. 2B shows alternative examples of user prompts for a user's selection among multiple scenarios involving trade-offs between display parameter settings and corresponding power consumption levels.

FIG. 2B shows alternative examples of user prompts for a user's selection among multiple scenarios involving trade-offs between display parameter settings and corresponding power consumption levels. In the example shown in FIG. 2B, a sensor system of the mobile display device 200 has determined that a particular user is using the mobile display device 200 for the first time in ambient light that is below a threshold level.

In this example, the display 210 is presenting text 235a that indicates this is the first time that the user has used the mobile display device 200 in the dark. Some implementations may provide similar information via audio. Alternative implementations may not directly indicate why the mobile display device 200 is prompting the user for information.

In this implementation, the text 235a also prompts a user to press buttons 240a and 240b and then to answer questions via an additional press on one of the buttons 240a and 240b. In this example, pressing button 240a causes an image corresponding to a first display parameter setting to be presented in the area 230 of the display 210 (image A), whereas pressing button 240b causes an image corresponding to a second display parameter setting to be presented in the area 230 (image B). This kind of user prompt may be referred to herein as an "A/B image prompt."

In some implementations, as here, the first display parameter setting and the second display parameter setting may correspond to different levels of power consumption. According to one such example, pressing button 240a causes an image with relatively higher color depth to be presented in the area 230, whereas pressing button 240b causes an image with relatively lower color depth to be presented in the area 230. However, in some implementations, an A/B image prompt may be used for a visual performance test, such as a color perception test, etc.

In this implementation, the mobile display device 200 is prompting the user to make a trade-off between display parameter settings and corresponding power consumption levels. In this example, the user is expressly prompted to choose between a better image and longer battery life: here, the display 210 is presenting text 235b that prompts a user to press button 240c in order to select longer battery life or to press button 240d in order to select the better image. The corresponding user preference data may be added to a user profile. In some implementations, the user may be told about the relative power consumption levels of controlling the display 210 according to the display parameter setting corresponding to Image A and controlling the display 210 according to according the display parameter setting corresponding to Image B.

Figure 2C:
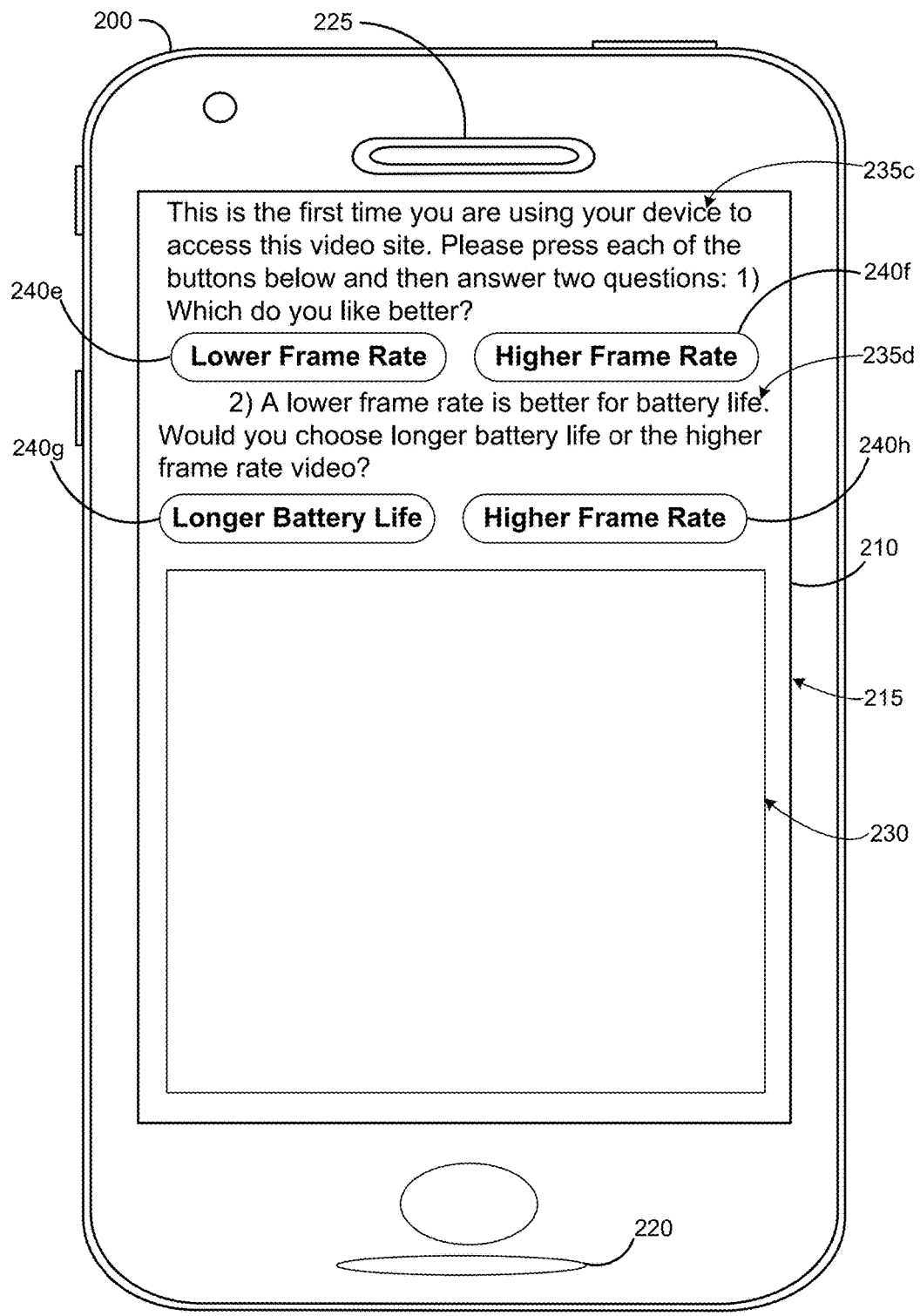
FIG. 2C shows additional examples of user prompts for a user's selection among multiple scenarios involving trade-offs between display parameter settings and corresponding power consumption levels.

FIG. 2C shows additional examples of user prompts for a user's selection among multiple scenarios involving trade-offs between display parameter settings and corresponding power consumption levels. In the example shown in FIG. 2C, a control system of the mobile display device 200 has determined that a particular user is using the mobile display device to access video data from a particular website for the first time. The website may provide relatively low-quality video or relatively high-quality video.

In this implementation, the mobile display device 200 is prompting the user, via at least the text 235c, to indicate a preference between a first display parameter setting and a second display parameter setting, each of which corresponds to different levels of power consumption. In this example, pressing button 240e causes video image data to be presented at a relatively lower frame rate to be presented in the area 230, whereas pressing button 240f causes video image data to be presented at a relatively higher frame rate in the area 230. Unless a different meaning is otherwise noted, the term "frame rate" as used herein refers to a rate at which frames of data are presented on a display rather than, for example, the frame rate at which a video, a movie, etc., was captured.

In this implementation, the mobile display device 200 is prompting the user, via at least the text 235d, to make a trade-off between display parameter settings and corresponding power consumption levels. In this example, the user is informed that presenting video data at the lower frame rate consumes less power. The user is prompted to choose between a higher frame rate and longer battery life: in this implementation, the display 210 is presenting text that prompts a user to press button 240g in order to select longer battery life or to press button 240h in order to select the higher frame rate. The corresponding user preference data may be added to a user profile.

Some users may not have the visual performance required for being able to discern the differences between some display parameter settings that consume relatively more or relatively less power. Some implementations may involve determining whether a user is able to discern such differences and, if a user is not able to discern such differences, selecting display parameter settings that consume relatively less power.

Accordingly, some implementations involve controlling the display of the mobile display device 200 to provide at least one user prompt for a visual performance test. The visual performance test may or may not be presented with information or selections regarding power consumption, depending on the implementation. Such implementations may involve receiving visual performance data, responsive to the at least one user prompt, via the mobile display device 200 and adding the visual performance data to the user profile.

Figure 2D:
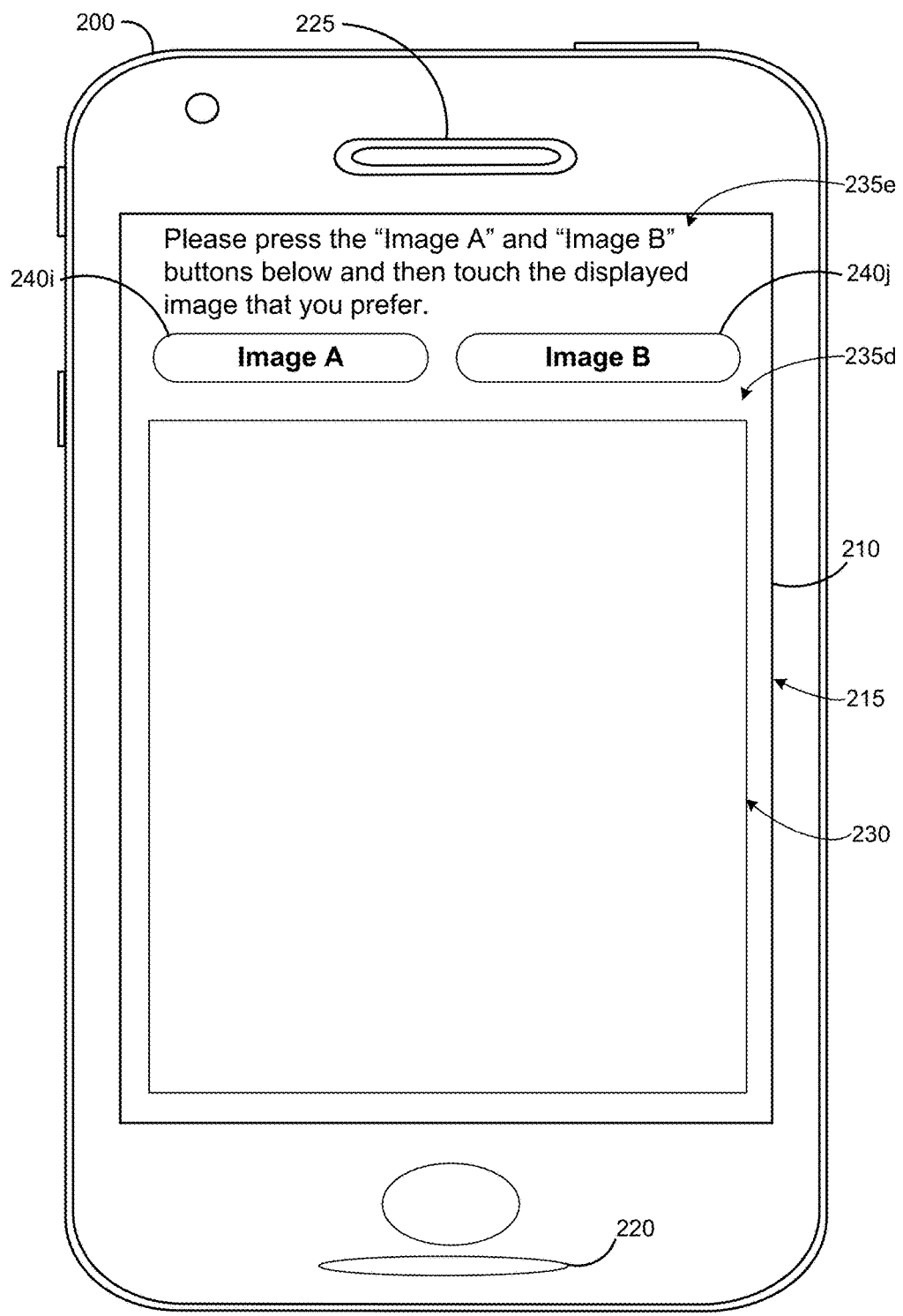
FIG. 2D provides an example of a user prompt for a visual performance test.

FIG. 2D provides an example of a user prompt for a visual performance test. The visual performance test may, for example, involve testing for color perception acuity, resolution acuity, dithering technique acuity, frame rate acuity, etc. In some examples, testing for color perception acuity may involve testing for color blindness or color brightness acuity. In some implementations, the visual performance test may, for example, involve presenting an eye chart, such as with rows of letters of decreasing size. Some implementations may involve presenting line patterns of differing thicknesses, color-difference test patterns, gray-scaling test patterns, etc. Some examples may request that the user view one or more images with and without prescription glasses, if any. In some implementations, visual performance tests may be presented at different times of day or under different lighting conditions. In this example, the mobile display device 200 is prompting a user, via at least the text 235e, to press buttons 240i and 240j, each of which will cause a corresponding image or video to be presented in area 230. Each image may correspond to a particular type of visual performance test or display parameter settings. In this example, the user is also prompted to select which of two images the user prefers, by touching the area 230 when the preferred image is displayed. The corresponding user preference data may be added to a user profile.

Figure 2E:
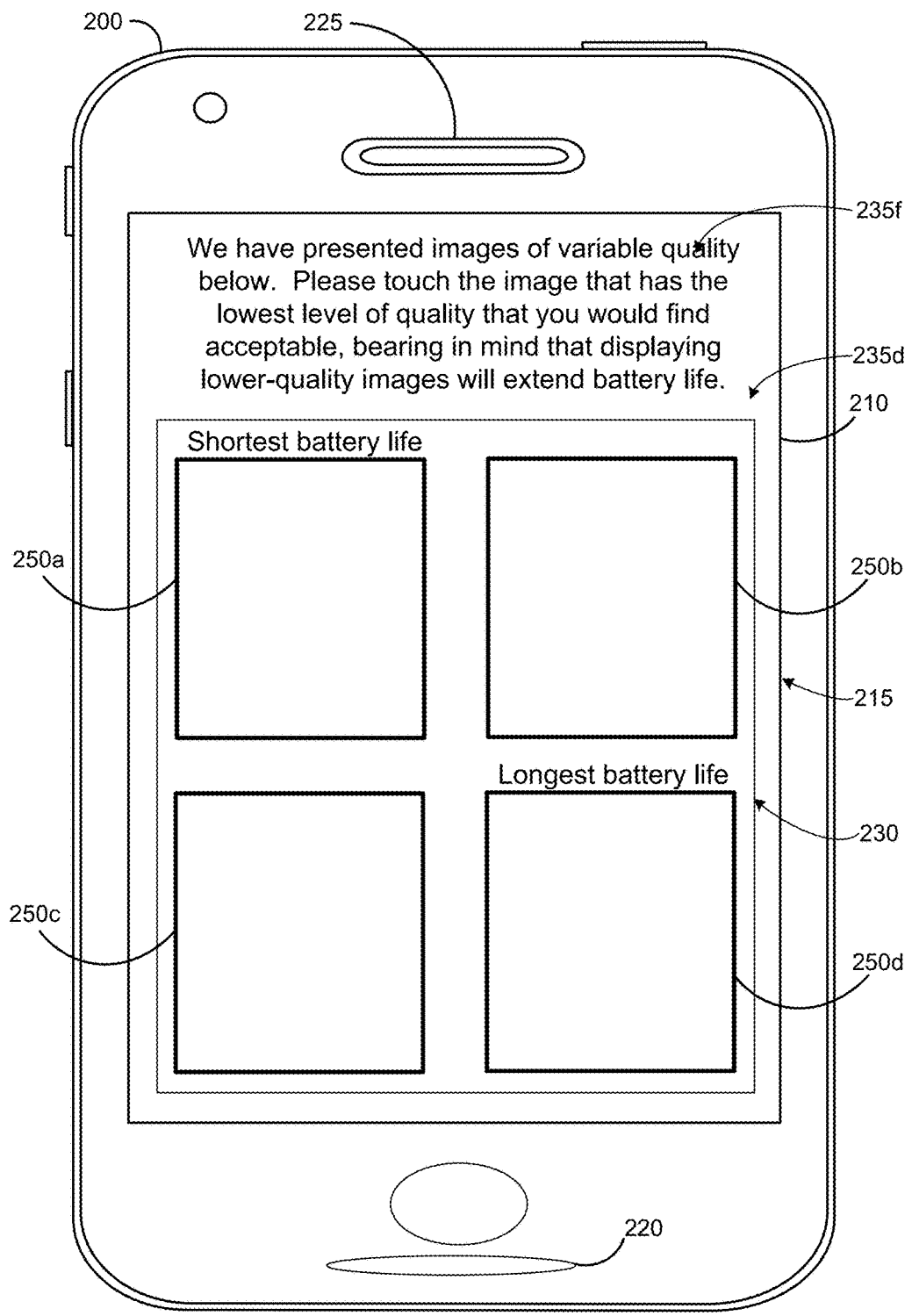
FIG. 2E provides another example of a user prompt for a visual performance test.

FIG. 2E provides another example of a user prompt for a visual performance test. In this example, the mobile display device 200 is prompting a user, via at least the text 235f, to select one of the images 250a-250d. Alternative implementations may involve presenting more or fewer images. In some implementations, the images 250a-250d may include text, one or more test patterns, etc. In some examples, the test patterns may include such as color blindness test patterns. According to some implementations, the text may include letters presented as an eye chart. In some implementations, the images 250a-250d may have different image properties and may, for example, be arranged from lowest image quality to highest or vice versa. For example, the images 250a-250d may be displayed with different pixel resolutions, with different levels of spatial gray-scaling, with different color gamuts, etc. In the example shown in FIG. 2E, the text 235f is prompting the user to select the image that has the lowest level of quality that the user would deem to be acceptable. Such a prompt may be may, in some examples, be part of a sequence of prompts, some of which may expressly involve trade-offs between display parameter settings and corresponding power consumption levels. In alternative implementations, the user may be prompted to select the image that is just below the user's level of acceptance or just above the user's ability to discern a significant difference.

A visual performance test like that of the A/B image prompt of FIG. 2D or the multiple-choice prompt of FIG. 2E may only require a few seconds of a user's time. Via a series of brief visual performance tests, which may be conducted during various instances of using a mobile display device 200 spread out over a period of time, a substantial amount of information regarding a user's visual performance, including but not limited to color perception, may be obtained via the mobile display device 200 without placing a significant burden on the user. In some examples, the period of time may be hours, days, weeks, months or years.

Some implementations disclosed herein may involve controlling a mobile display device 200 according to a hierarchy of criteria. For example, some implementations may involve controlling the display 210 of the mobile display device 200 according to a hierarchy of criteria. According to some such implementations, the hierarchy of criteria may include the battery state of the mobile display device 200, the luminance of ambient light or ambient temperature. As described in more detail elsewhere herein, some implementations may involve automatically selecting at least one display parameter setting or other setting of a mobile display device 200 according to a hierarchy of criteria.

Some such implementations may involve automatically selecting at least one display parameter setting responsive to a software application being executed by the mobile display device 200. For example, some implementations may involve determining a software application that is currently being executed by the mobile display device 200 and controlling the display 210 based, at least in part, on the software application.

Some implementations may involve the use of image enhancement applications, such as image enhancement applications for increasing contrast or brightness, image enhancement applications for color adjustment, image enhancement applications for gamma correction, etc. Such image enhancement applications may, for example, be in the form of software applications or "apps" that may be stored in a memory of the mobile display device 200. In some implementations, such image enhancement applications may be obtained from another device, such as downloaded from a server.

In some such implementations, the mobile display device 200 may be capable of selecting an image enhancement application based on ambient light conditions. For example, if an ambient light sensor of the mobile display device 200 indicates a condition of bright ambient light, in some implementations the mobile display device 200 may be capable of selecting and executing an image enhancement application that increases display brightness or image contrast. According to some such examples, the ambient light sensor may be part of the sensor system 1179 shown in FIGS. 11A and 11B and described below. Some such image enhancement applications also may provide edge enhancement for a displayed image.

In some examples, the mobile display device 200 may be capable of selecting an image enhancement application based on user information, such as a user's ability to perceive color. In some such examples, if the user information indicates a less-than-normal ability to perceive one or more colors, the mobile display device 200 may be capable of selecting and executing an image enhancement application that enhances the corresponding color(s).

Figure 3:
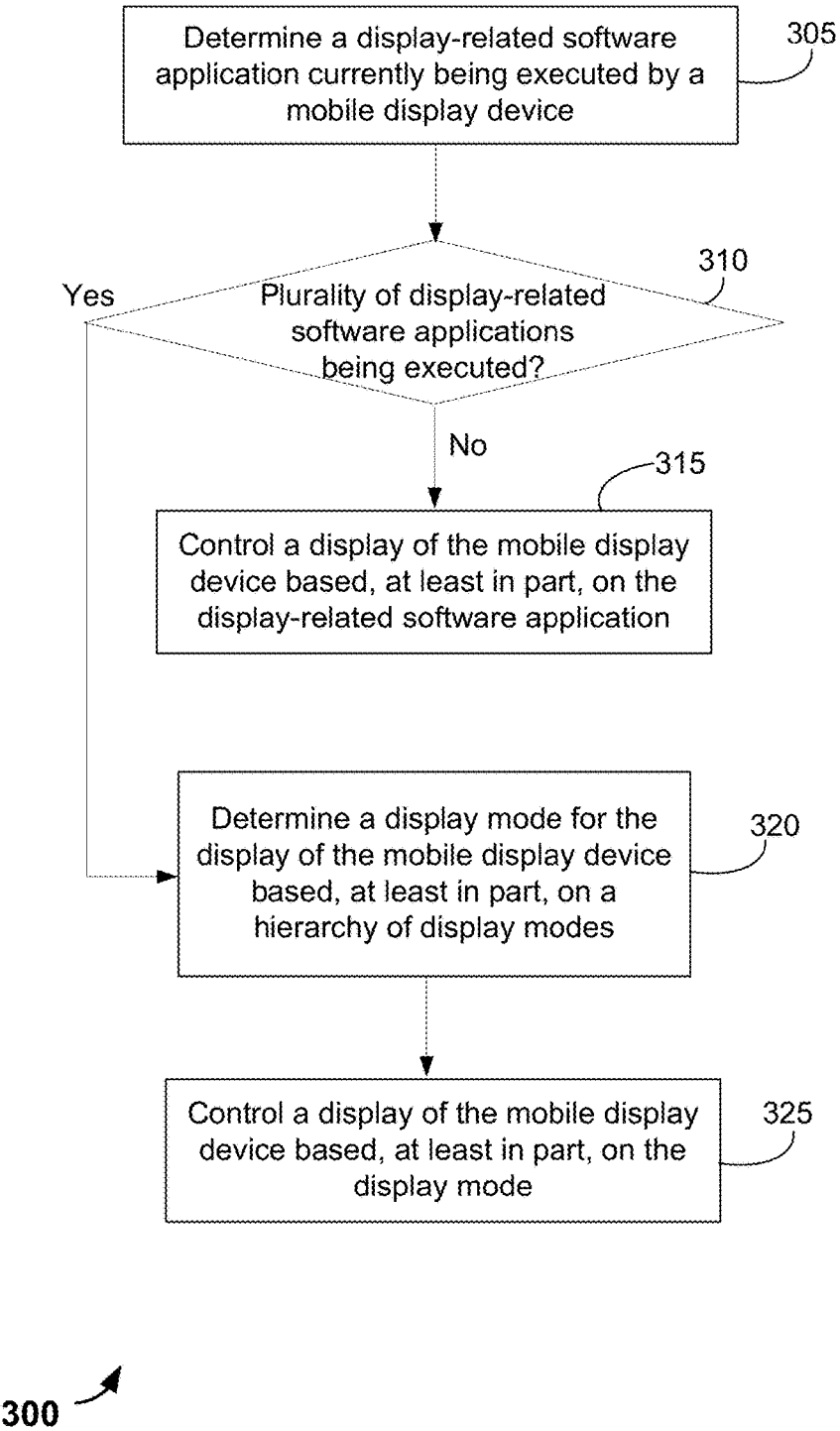
FIG. 3 is a flow diagram that outlines one example of a method for customizing display parameter settings of a mobile display device according to a software application being executed by the mobile display device.

FIG. 3 is a flow diagram that outlines one example of a method for customizing display parameter settings of a mobile display device according to a software application being executed by the mobile display device. The blocks of method 300, like other methods described herein, are not necessarily performed in the order indicated. Moreover, such methods may include more or fewer blocks than shown or described.

In this implementation, block 305 involves determining a display-related software application that is currently being executed by the mobile display device 200. Various examples of display-related software applications are described below. In this example, block 310 involves determining whether a plurality of display-related software applications is currently being executed by the mobile display device 200. Here, if it is determined in block 310 that a plurality of display-related software applications is not currently being executed by the mobile display device, the process continues to block 315, which involves controlling the display 210 of the mobile display device 200 based, at least in part, on the single display-related software application currently being executed by the mobile display device 200.

In some examples, if it is determined in block 305 that the display-related software application is a camera application, an application for displaying video data, an application for viewing still images, such as high-resolution digital photographs, or an application for editing still images on the display 210, block 315 may involve controlling the display 210 according to display parameter settings that will enhance a user's viewing experience, even at the cost of relatively greater power consumption. For example, block 315 may involve controlling the display 210 according to display parameter settings that correspond with one or more of a high color depth setting, a high color gamut setting, a high frame rate, etc. In some such examples, block 315 may involve controlling the display 210 according to a 20-bit color depth setting or a 24-bit color depth setting. In some such implementations, block 315 may involve controlling the display 210 according to a 60 frame/second, a 75 frame/second or a 120 frame/second frame rate. According to some such examples, block 315 may involve controlling the display 210 to provide a color gamut that is greater than 100% of the International Commission on Illumination (CIE) 1931 color space.

According to some examples, if it is determined in block 305 that the display-related software application is a word processing application, a spreadsheet application, a slide authoring application (such as PowerPoint™) or a similar application, block 315 may involve controlling the display 210 according to display parameter settings that will provide an acceptable viewing experience while causing a moderate or low level of power consumption. For example, block 315 may involve controlling the display 210 according to display parameter settings that correspond with one or more of a low to moderate color depth setting, a low to moderate color gamut setting, a low to moderate frame rate, etc. In some examples, block 315 may involve controlling the display 210 according to an 8-bit color depth setting or a 16-bit color depth setting. In some such examples, block 315 may involve controlling the display 210 according to a 15 frame/second, a 24 frame/second or a 30 frame/second frame rate. According to some such examples, block 315 may involve controlling the display 210 to provide a color gamut that is in the range of 60%-70% of the CIE 1931 color space.

In some implementations, if it is determined in block 305 that the display-related software application is a text messaging application, block 315 may involve controlling the display 210 according to display parameter settings that will provide an acceptable viewing experience while causing a low level of power consumption. For example, block 315 may involve controlling the display 210 according to display parameter settings that correspond with one or more of a low color depth setting, a low color gamut setting, a low frame rate, etc. In some such examples, block 315 may involve controlling the display 210 according to an 8-bit color depth setting. In some such examples, block 315 may involve controlling the display 210 according to a 6 frame/second or a 12 frame/second frame rate. According to some such examples, block 315 may involve controlling the display 210 to provide a color gamut that is less than 50% of the CIE 1931 color space.

According to some implementations, if it is determined in block 305 that the display-related software application is a navigation-related application, such as a Global Positioning System (GPS)-based application, block 315 may involve controlling the display 210 according to display parameter settings that will result in a relatively low level of power consumption. However, some such implementations may involve controlling the display 210 according to display parameter settings that will provide vivid colors for at least some displayed elements, such as color-coded indications of traffic conditions, accidents, etc. For example, block 315 may involve controlling the display 210 according to display parameter settings that correspond with a high color gamut setting, a low to moderate color depth setting and a low frame rate. In some such examples, block 315 may involve controlling the display 210 according to an 8-bit color depth setting or a 16-bit color depth setting. In some such examples, block 315 may involve controlling the display 210 according to a 6 frame/second or a 12 frame/second frame rate. According to some such examples, block 315 may involve controlling the display 210 to provide a color gamut that is more than 100% of the CIE 1931 color space.

According to some implementations, if it is determined in block 305 that the display-related software application is a game-related application, block 315 may involve controlling the display 210 according to display parameter settings that will result in a relatively low level of power consumption while providing a high color saturation. Such settings may be desirable so that a user can see the colors of game-related features clearly while extending the period of battery-powered game play. For example, block 315 may involve controlling the display 210 according to display parameter settings that correspond with a high color gamut setting, a low to moderate color depth setting and a low frame rate. In some such examples, block 315 may involve controlling the display 210 according to an 8-bit color depth setting or a 16-bit color depth setting. In some such examples, block 315 may involve controlling the display 210 according to a 6 frame/second or a 12 frame/second frame rate. According to some such examples, block 315 may involve controlling the display 210 to provide a color gamut that is more than 100% of the CIE 1931 color space.

According to some implementations, if it is determined in block 305 that the display-related software application is a fitness-related application, block 315 may involve controlling the display 210 according to display parameter settings that will result in a relatively low level of power consumption while providing a high color saturation. Such settings may be desirable in order for a user to be able to see fitness-related data clearly. According to some implementations, the fitness-related data may include elapsed time, calorie burning rate, speed, direction information or heart rate. For example, block 315 may involve controlling the display 210 according to display parameter settings that correspond with a high color gamut setting, a low to moderate color depth setting and a low frame rate. In some such examples, block 315 may involve controlling the display 210 according to an 8-bit color depth setting or a 16-bit color depth setting. In some such examples, block 315 may involve controlling the display 210 according to a 6 frame/second or a 12 frame/second frame rate. According to some such examples, block 315 may involve controlling the display 210 to provide a color gamut that is more than 100% of the CIE 1931 color space. According to some implementations, block 315 may involve controlling a light source of the display 210 to provide a moderate to high level of brightness, at least under certain conditions. According to some implementations, the level of brightness may depend on the battery state of the mobile display device, the ambient light conditions, or other factors.

In some implementations, block 315 may involve controlling the display 210, at least in part, according to a single set of display parameter settings that correspond with a particular software application. The set of display parameter settings may be modified depending on factors such as detected ambient light intensity, the detected spectral content of ambient light, the battery state of the mobile display device, the ambient temperature, etc., as described elsewhere herein. These factors may be part of a hierarchy of display modes, such as those described elsewhere herein.

However, some implementations may involve modifying the display parameter settings according to other contextual changes, such as detected changes in the usage of a software application. According to some such implementations, a single software application may have two or more corresponding sets of display parameter settings, each of which may depend (at least in part) on the current usage of the software application.

For example, if it is determined in block 305 that the display-related software application is a text messaging application, block 315 may involve controlling the display 210 according to two or more sets of display parameter settings, depending on the current usage of the text messaging application. In one example, a first set of display parameter settings may be applied when the text messaging application is being used only to view and author text. The first set of display parameter settings may, in some implementations, include a low color depth setting, a low color gamut setting, a low frame rate, etc. In some such examples, block 315 may involve controlling the display 210 according to an 8-bit color depth setting.

However, in some implementations a second set of display parameter settings may be applied when the text messaging application is being used to view an embedded image, such as an image corresponding to a photograph received via the text messaging application. The second set of display parameter settings may, in some implementations, include a high color depth setting, a high color gamut setting, etc. In some such examples, block 315 may involve controlling the display 210 according to a 20-bit color depth setting or a 24-bit color depth setting. However, in alternative examples block 315 may involve controlling the display 210 according to a color depth setting that is lower than a 20-bit color depth setting or higher than a 24-bit color depth setting.

According to some examples, a third set of display parameter settings may be applied when the text messaging application is being used to view and author text, some of which includes small embedded images, such as embedded emoji. In some such instances, the primary usage of the text messaging application may be for text communication and therefore a power-saving mode may be appropriate. However, a user may desire that the emoji be displayed, for example with sufficient color depth to make a satisfactory presentation. In some such examples, the third set of display parameter settings may include one or more of a moderate color depth setting, a moderate color gamut setting, a low frame rate, etc. In some such examples, block 315 may involve controlling the display 210 according to a 16-bit color depth setting.

In some implementations, the above-described first, second and third set of display parameter settings may be implemented as part of a hierarchy of display modes, such as those described elsewhere herein. For example, if the battery of the mobile display device 200 has less than a threshold power level remaining, block 315 may involve selecting a black and white display mode for controlling the display instead of the second set of display parameter settings even if the text messaging application is being used to display emoji or to view an image corresponding to a photograph received via the text messaging application.

According to some implementations, block 315 may involve referring to a data structure that includes indications of one or more types of software applications and corresponding display parameter setting information. In some examples, at least some instances of the display parameter setting information may be based, at least in part, on user preference data. Such user preference data may, for example, have been previously obtained via user prompts, such as those described above with reference to FIGS. 2A-2E and described above. However, in some implementations, at least some instances of the display parameter setting information may be default settings. According to some implementations, the default settings may be based, at least in part, on information obtained from a server, which may be as described below with reference to FIG. 6.

However, if it is determined in block 310 that a plurality of display-related software applications is currently being executed by the mobile display device 200, the process continues to block 320. In some implementations, as here, block 320 may involve determining a display mode for the display 210 of the mobile display device 200 based, at least in part, on a hierarchy of display modes. For example, a control system of the mobile display device 200 may be capable of operating the display 210 according to various display modes. The display modes may be assigned a rank, such as according to the quality of the displayed images, according to corresponding levels of power consumption or according to one or more other criteria. Block 320 may involve selecting a display mode based, at least in part, on the rank of the display mode. Some detailed examples are provided elsewhere herein. According to some such hierarchy-based examples, a display mode also may be selected according to other factors, such as ambient lighting intensity, the battery state of the mobile display device, the ambient temperature, etc.

In some implementations, each display-related software application that is currently being executed by the mobile display device 200 may have a corresponding display mode. In some such implementations, block 320 may involve determining a display mode corresponding to each of the software applications. For example, block 320 may involve querying a local storage device of the mobile display device 200 to determine a display mode corresponding to each of the display-related software applications. Alternatively, or additionally, block 320 may involve querying, via a network interface of the mobile display device 200, a remote storage device maintained by another device, such as a server, to determine a display mode corresponding to each of the display-related software applications.

If, for example, it is determined in block 310 that two display-related software applications are being executed by the mobile display device 200, block 320 may involve determining the display mode corresponding to each of the two display-related software applications and selecting the higher-ranked display mode for controlling the display 210. Here, block 325 involves controlling a display 210 of the mobile display device 200 based, at least in part, on the higher-ranked display mode selected in block 320.

For example, it may be determined in block 310 that the mobile display device 200 is simultaneously executing a text messaging application and a second application. The second application may, in some examples, be a word processing application, a spreadsheet application, a slide authoring application or a similar application. According to some such implementations, block 320 may involve determining first display mode corresponding to the text messaging application and a second display mode corresponding to the second application. In some examples, the second display mode may be the higher-ranked display mode. Block 325 may involve controlling the display 210 of the mobile display device 200 based, at least in part, on the higher-ranked display mode.

However, the mobile display device 200 may sometimes be simultaneously executing two or more applications, at least one of which has two or more corresponding sets of display parameter settings. In some examples, each of the sets of display parameter settings may depend (at least in part) on the current usage of the software application. Some examples are provided above in the context of a text messaging application.

According to some such implementations, even if the software applications being executed on the mobile display device do not change, block 320 may involve determining a different display mode according to a changed usage of one of the software applications. For example, it may be determined in block 310 that the mobile display device 200 is simultaneously executing a text messaging application and a word processing application. According to some such implementations, block 320 may involve determining first display mode corresponding to the word processing application and multiple display modes corresponding to the text messaging application. In some examples, block 320 may involve determining that the text messaging application has three display modes corresponding to three sets of display parameter settings, such as those described above, whereas in other examples block 320 may involve determining that the text messaging application has more or fewer display modes corresponding to more or fewer sets of display parameter settings. One or more of the display modes corresponding to the text messaging application may have a higher rank than the rank of the first display mode corresponding to the word processing application.

Therefore, in this example block 320 may involve determining whether a display mode associated with a current usage of the text messaging application has a higher or a lower rank than that of the first display mode corresponding to the word processing application. For example, block 320 may involve determining a current usage of the text messaging application, determining a rank of a display mode corresponding to the current usage of the text messaging application, comparing the rank of a display mode corresponding to the current usage of the text messaging application with a rank of the display mode of the word processing application, and selecting the higher-ranked display mode. Block 325 may involve controlling the display 210 of the mobile display device 200 based, at least in part, on the higher-ranked display mode.

It may sometimes be the case that use of web browser software, which also may be referred to herein simply as a "web browser," will involve the simultaneous execution of multiple software applications on the mobile display device 200. The main function of a web browser is to present a web resource selected by a user, normally by requesting the web resource from a server and displaying the web resource in a browser window. The web resource may, for example, be selected by a user via a Uniform Resource Identifier (URI). The web resource may often be a HyperText Markup Language (HTML) document. Accordingly, in some instances block 315 or block 320 may involve determining a display mode that is appropriate for viewing text of a web page corresponding with the HTML document.

For example, if the only software application currently being executed on the mobile display device 200 is a web browser that is currently being used for viewing text of a web page, block 315 may involve controlling the display 210 according to display parameter settings that correspond with one or more of a low color depth setting, a low color gamut setting, a low frame rate, etc. In some such examples, block 315 may involve controlling the display 210 according to an 8-bit color depth setting.

However, the web resource also may include a PDF, an image file, software for displaying a video, or some other type of content. If, for example, the only display-related software application currently being executed on the mobile display device 200 is a web browser that is currently being used to display a web resource that includes an image file corresponding to, for example, a color photograph, block 315 may involve controlling the display 210 according to display parameter settings that correspond with one or more of a high color depth setting and a high color gamut setting. According to some examples, block 315 may involve controlling the display 210 according to similar display parameter settings if the web resource includes a window with which a user may interact to display a color video. In some such examples, block 315 may involve controlling the display 210 according to a 20-bit color depth setting or a 24-bit color depth setting. However, in alternative examples block 315 may involve controlling the display 210 according to a color depth setting that is lower than a 20-bit color depth setting or higher than a 24-bit color depth setting.

If the mobile display device 200 is currently executing web browser software and is also executing a second type of software, block 320 may involve determining whether a display mode associated with a current usage of the second type of software has a higher or a lower rank than that of the display mode corresponding to the current usage of the web browser software. In some examples, metatags in the web resource also may allow a control system of the mobile display device 200 to determine whether a web resource includes a PDF, an image file, software for displaying a video, or other content that may be relevant to display parameter selection.

In some examples, the mobile display device 200 may be capable of controlling two or more portions of the display 210 according to different display modes. According to some implementations, the mobile display device 200 may be capable of controlling a first portion of the display 210 according to a first display mode and a second portion of the display 210 according to a second display mode.

According to some such implementations, if it is determined in block 310 that a plurality of software applications is being executed on the mobile display device 200, method 300 may involve determining whether a first portion of the display 210 is presenting a first image corresponding to a first software application and whether a second portion of the display 210 is presenting a second image corresponding to a second software application. For example, the first software application may be a text-based application, such as a text messaging application. The second portion of the display 210 may be a window in which the second application is displaying an image, a graphical user interface corresponding to a software application for viewing video, etc. According to some such examples, block 320 may involve determining a first display mode for controlling the first portion of the display and determining a second display mode for controlling the second portion of the display.

Figure 4A:
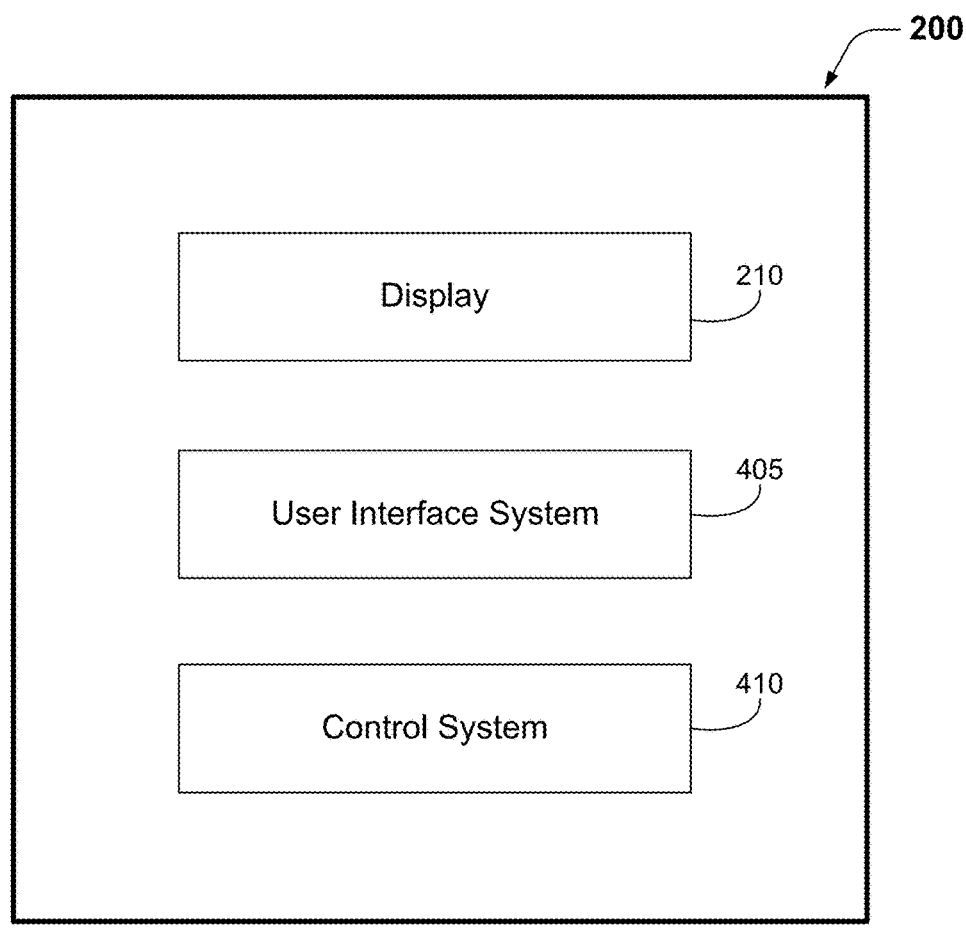
FIG. 4A is a block diagram that shows example elements of a mobile display device.

FIG. 4A is a block diagram that shows example elements of a mobile display device. In this example, the mobile display device 200 includes a display 210, a user interface system 405 and a control system 410. In some implementations, the user interface system 405 may include a touch or gesture sensor system, which in some implementations may include a touch screen that overlies at least a portion of the display 210. In some such implementations, the user interface system 405 may include a touch sensing system 10 such as the touch sensing system 10 that is shown in FIG. 11B and described below. According to some such implementations, the control system 410 may include a touch controller such as the touch controller 1177 that is shown in FIG. 11B and described below. In some examples, the user interface system 405 may include a microphone for receiving voice commands and associated voice recognition software, hardware or firmware, which may be part of, or executable by, the control system 410. For example, the user interface system 405 may include a microphone 1146 such as that shown in FIG. 11B and described below. In some implementations, the user interface system 405 may include one or more buttons, keys, etc. For example, the user interface system 405 may include one or more examples of input devices 1148 that are described below with reference to FIG. 11B.

The control system 410 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 410 also may include, or be configured for communication with, one or more memory devices, such as one or more random access memory (RAM) devices, read-only memory (ROM) devices, etc. In some implementations, control system 410 may include elements such as the processor 1121, the driver controller 1129 or the array driver 1122 that are shown in FIG. 11B and described below.

The control system 410 may be capable of performing, at least in part, the methods disclosed herein. For example, the control system 410 may be capable of controlling the display 210 to provide at least one user prompt for user preference data, including at least one user prompt for a user's selection among multiple scenarios involving trade-offs between display parameter settings and corresponding power consumption levels. The control system 410 may be capable of receiving the user preference data via the user interface system 405. The control system 410 may be capable of adding the user preference data to a user profile and of controlling the display 210, at least in part, according to the user profile.

In some implementations, the control system 410 may be capable of controlling the display 210 to provide at least one user prompt for a visual performance test. The control system 410 may be capable receiving visual performance data, responsive to the at least one user prompt, and of adding the visual performance data to the user profile. According to some such implementations, the control system 410 may be capable of controlling the mobile display device to enter a battery saving mode based, at least in part, on the visual performance data. For example, the visual performance data may indicate that user cannot perceive the difference between 220 and 440 ppi images. In that case, the control system 410 may put the display 210 in a mode wherein the images are displayed at 220 ppi instead of 440 ppi, thereby lowering the number of voltage swings in the image data and reducing display power consumption. As another example, the visual performance data may indicate that the user cannot perceive the difference between 20 and 24 bit color. In that case, the control system 410 may put the display 210 in a mode wherein the images are displayed at 20 bit color instead of 24 bit color, thereby lowering the number of transitions needed in a field sequential color system and reducing the power consumption. Alternatively, or additionally, the control system 410 may be capable of controlling the mobile display device to enter a battery saving mode based, at least in part, on user preference data. For example, the user may have indicated that lower frame rate video is tolerable when extending battery life, and therefore the control system 410 may put the display 210 in a lower frame rate mode.

In some implementations, the control system 410 may be capable of controlling the mobile display device to enter a visually compensatory mode based on the visual performance data. For example, the control system 410 may be capable of controlling the display 210 to add more of a color if the visual performance data indicates a lower sensitivity to that color. In some such examples, the control system 410 may be capable of controlling the display 210 to add more blue, more red, more yellow, more green, etc.

According to some implementations, the control system 410 may be capable of controlling the display 210 according to a hierarchy of criteria. For example, the hierarchy of criteria may include battery state, luminance of ambient light, ambient temperature, or information in the user profile.

In some implementations, the control system 410 may be capable of determining a software application that is currently being executed by the mobile display device and of controlling the display 210 based, at least in part, on the software application. The control system 410 may be capable of determining that a plurality of software applications is currently being executed by the mobile display device and of determining a display mode for the display 210 based, at least in part, on a hierarchy of display modes.

According to some implementations, mobile display device 200 may include a network interface. In some examples, the control system 410 may be capable of transmitting, via the network interface, user information to another apparatus, such as a server. According to some such examples, the user information may include user profile information or user preference information. In some such implementations, the other apparatus may be capable of maintaining the user profile information, updating the user profile information, etc. In some implementations, the control system 410 may be capable of receiving, via the network interface, user profile information, or other information, from the other apparatus. In some examples, the other apparatus may be a server.

In some such implementations, the control system 410 may be capable of transmitting, via the network interface, user preference data to an apparatus. The control system 410 may be capable of receiving, from the apparatus and via the network interface, display parameter setting information corresponding to the user preference data. The control system 410 may be capable of controlling the display 210 according to the display parameter setting information.

In some implementations, the mobile display device 200 may include an inertial sensor system. The inertial sensor system may, for example, include one or more gyroscopes, accelerometers, etc. According to some such examples, the control system 410 may be capable of controlling the display 210 based, at least in part, on inertial sensor data received from the inertial sensor system.

For example, based at least in part on inertial sensor data received from the inertial sensor system, the control system 410 may be capable of determining whether a user is walking, jogging, riding a skateboard, riding a bicycle, standing on a train, sitting in a car, etc. Such usage contexts for the mobile display device 200 may be referred to herein as "motion-based contexts." According to some such implementations, each motion-based context may have at least one corresponding set of display parameter settings.

Differentiating display parameter settings according to motion-based context may be advantageous, at least in part, because some motion-based contexts may be more likely than others to cause color break-up (CBU). CBU is a phenomenon that can degrade the image quality in field-sequential color (FSC) displays. Typically, CBU manifests itself as color-splitting patterns or a rainbow effect at the boundary between two different colors. CBU can occur when there is relative motion between displayed images and an observer's eye. Accordingly, CBU can be observed in stationary or moving images.

If a user is walking slowly while viewing the display 210, the user may be able to maintain continuous eye contact with the display over a period of several seconds or more. There may be relatively little relative motion between displayed images and the user's eye and, therefore, little or no CBU. However, if a user is jogging, riding a bicycle, etc., while viewing the display 210, the user may only be able to glance at the display for a relatively short time period, which may often be less than a second. There may be relatively more relative motion between displayed images and the user's eye and consequently relatively more CBU.

Figure 4B:
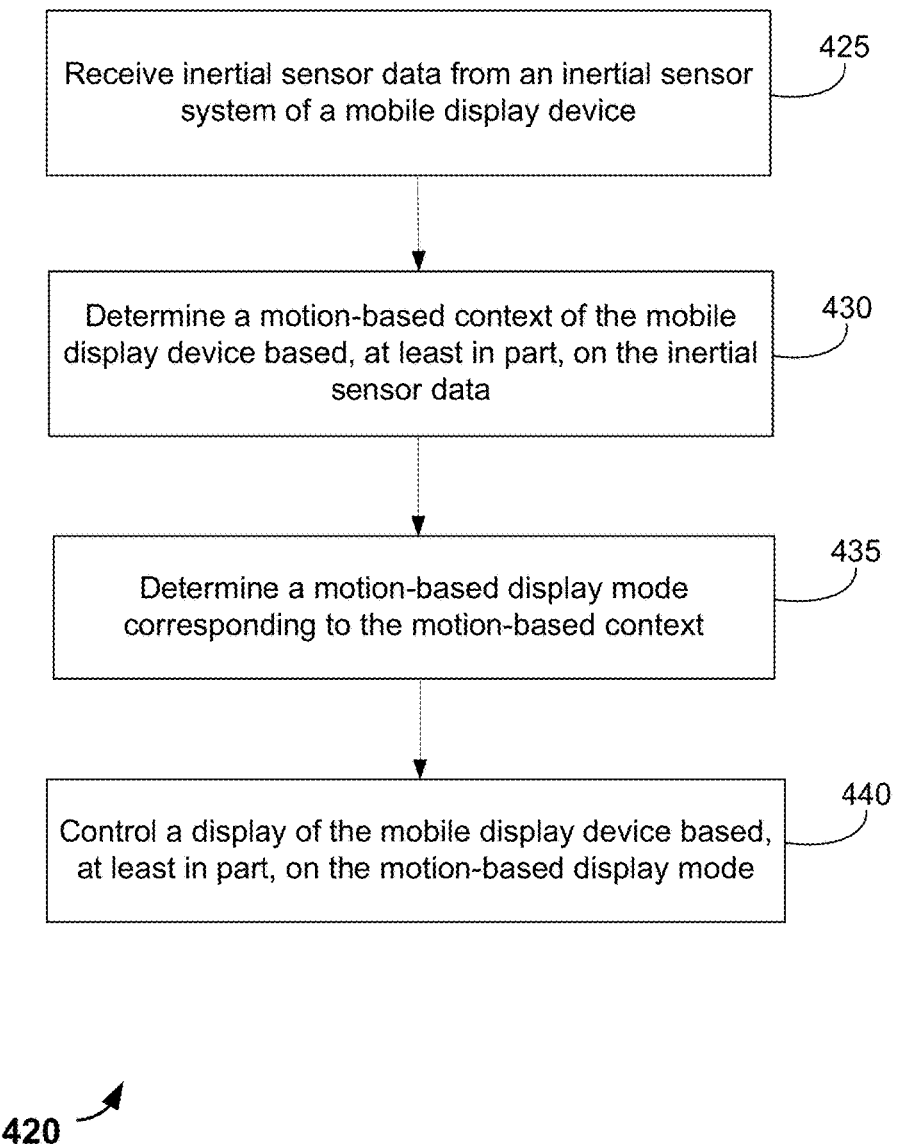
FIG. 4B is a flow diagram that outlines one example of a method for controlling display modes of a mobile display device according to motion-based contexts.

FIG. 4B is a flow diagram that outlines one example of a method for controlling display modes of a mobile display device according to motion-based contexts. The blocks of method 420, like other methods described herein, are not necessarily performed in the order indicated. Moreover, such methods may include more or fewer blocks than shown or described. In some implementations, method 420 may be performed, at least in part, by a mobile display device control system, such as the control system 410 shown in FIG. 4A.

In this implementation, block 425 involves receiving inertial sensor data from an inertial sensor system of a mobile display device. Block 425 may, for example, involve receiving accelerometer data, receiving gyroscope data, or both.

According to this example, block 430 involves determining a motion-based context of the mobile display device. Here, the determination of block 430 is based, at least in part, on the inertial sensor data. Block 430 may, in some implementations, involve referring to a data structure that includes a plurality of motion-based contexts and corresponding patterns of inertial sensor data. The motion-based contexts may, for example, include one or more of using the mobile display device while walking, jogging, riding a skateboard, riding a bicycle, standing on a train, riding in a car on a smooth road, riding in a car on a bumpy road, stationary standing or sitting, etc. According to some such examples, block 430 may involve comparing the inertial sensor data with the patterns of inertial sensor data and finding the closest match.

According to this implementation, block 435 involves determining a motion-based display mode corresponding to the motion-based context that is determined in block 430. Block 435 may, in some implementations, involve referring to a data structure that includes a plurality of motion-based contexts and corresponding motion-based display modes. Here, block 440 involves controlling the display based, at least in part, on the motion-based display mode.

The motion-based display modes may, for example, be modified versions of display modes corresponding to a software application, battery state, etc., as described elsewhere herein. For example, if a software application currently being executed on the mobile display device is a text messaging application and a motion-based context of stationary sitting or standing is determined in block 430, block 435 may involve determining a display mode having a low color depth setting, a low color gamut setting, a low frame rate, etc. However, if the same software application is running on the mobile display device and a motion-based context of jogging, riding a skateboard or riding a bicycle is determined in block 430, block 435 may involve determining a display mode having a low color depth setting, a low color gamut setting and a high frame rate, in order to compensate for CBU.

FSC methods generally involve a rapid sequence of display setting changes that correspond to color fields or "sub-frames" within each data frame. During each of the color fields, a display of the mobile display device may be illuminated with a corresponding color of light, such as a sequence of red, green and blue lights.

According to some implementations, block 435 may involve altering an FSC-based display mode in order to compensate for CBU. According to some such implementations, if a motion-based context of jogging, riding a skateboard, riding a bicycle, etc., is determined in block 430, block 435 may involve increasing a number of sub-frames during each data frame in order to compensate for CBU. Including white light (such as from a white LED) with the colors flashed during an FSC-based display mode also can mitigate CBU. Including white light can produce the effect of bringing colors closer together in color space, even though the colors are spatially dispersed on the retina. Accordingly, in some such implementations, block 435 may involve inserting a white sub-frame during each data frame in order to compensate for CBU.

In some instances, a mobile display device may be used in cooperation with another device. For example, the mobile display device may be capable of communication with a wearable device, such as a watch or a wearable medical device. In some such examples, a wearable medical device may include a monitoring device. According to some examples, a wearable medical device may be capable of administering a substance, such as a drug. If, for example, a user is primarily viewing a watch capable of communication with the mobile display device instead of the mobile display device itself, it may be desirable to control a display of the mobile display device in a low-power mode, such as a sleep mode.

Figure 4C:
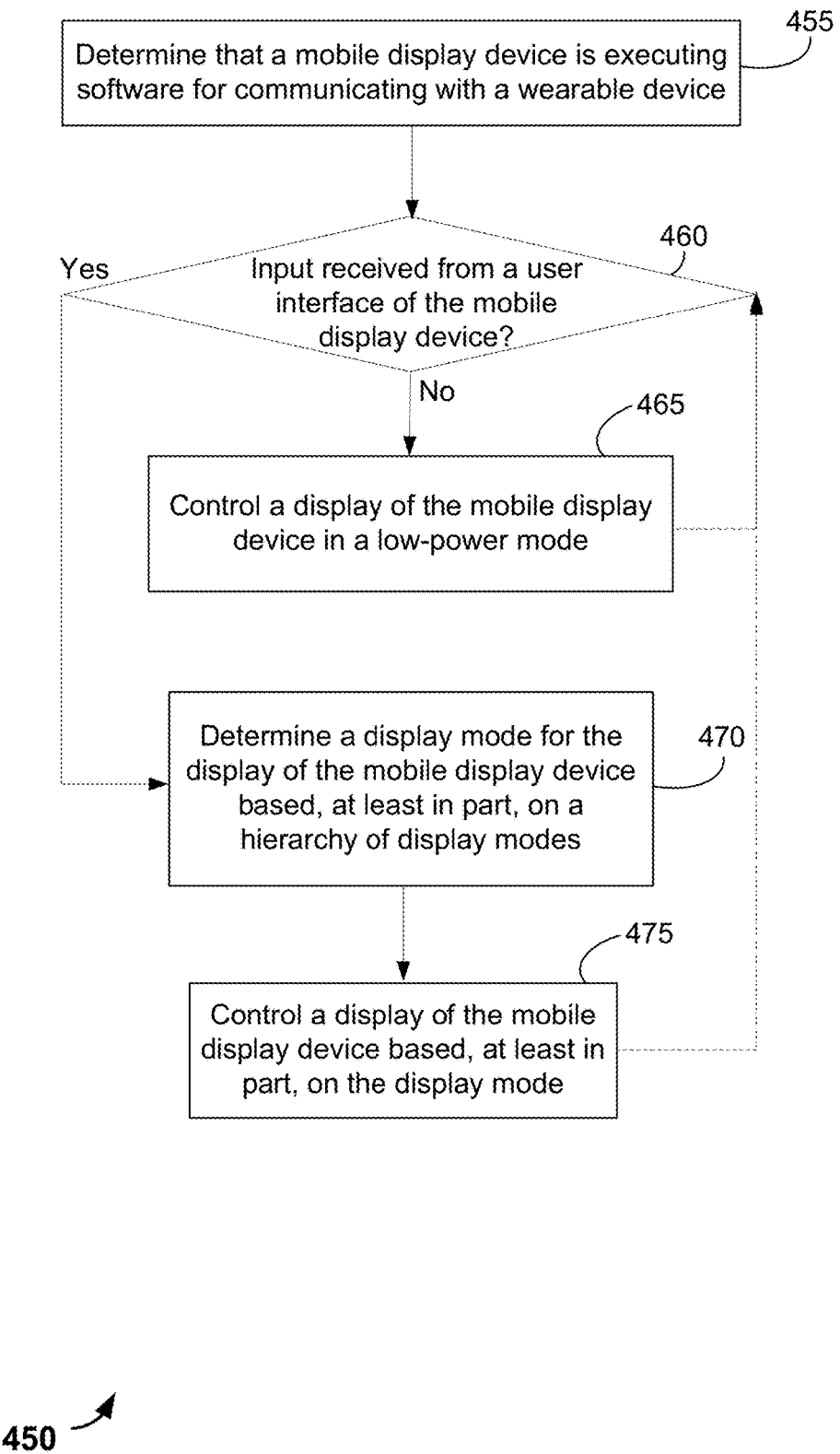
FIG. 4C is a flow diagram that outlines one example of a method for controlling display modes of a mobile display device that is capable of communication with a wearable device.

FIG. 4C is a flow diagram that outlines one example of a method for controlling display modes of a mobile display device that is capable of communication with a wearable device. The blocks of method 450, like other methods described herein, are not necessarily performed in the order indicated. Moreover, such methods may include more or fewer blocks than shown or described. In some implementations, method 450 may be performed, at least in part, by a mobile display device control system, such as the control system 410 shown in FIG. 4A.

In this implementation, block 455 involves determining that the mobile display device is executing software for communicating with the wearable device. According to this example, block 460 may involve determining whether input is being received from a user interface of the mobile display device, or whether input has been received from the user interface within a predetermined period of time. The user interface may, for example, be part of a user interface system such as the user interface system 405 shown in FIG. 4A and described above. Accordingly, in some examples the user interface system may include one or more of a touch sensor system, a gesture sensor system, etc. The predetermined period of time may vary according to the particular implementation. In some examples, the predetermined period of time may be less than 10 seconds, around 10 seconds, 15 seconds, 20 seconds, 25 seconds, 30 seconds, 45 seconds, one minute or more than one minute.

In this example, if it is determined in block 460 that input is being received from a user interface of the mobile display device, or that input has been received from the user interface within a predetermined period of time, the process continues to block 470. In this implementation, block 470 involves determining a display mode for the display of the mobile display device based, at least in part, on a hierarchy of display modes. Here, block 475 involves controlling a display of the mobile display device based, at least in part, on the display mode selected in block 470. The process may, in some examples, revert to block 460 after a predetermined period of time, which may or may not be the same predetermined period of time described with reference to block 460.

However, according to this implementation, if it is determined in block 460 that user input has not been received from a user interface of the mobile display device within the predetermined period of time, the process continues to block 465. In this implementation, block 465 involves controlling a display of the mobile display device according to a low-power mode. The low-power mode may, for example, be a sleep mode. In some implementations, the low-power mode may initially be a display mode corresponding with a low battery state, such as described elsewhere herein. The process may, in some examples, revert to block 460 after a predetermined period of time, which may or may not be the same predetermined period of time described with reference to block 460. After a time interval without receiving user input from a user interface of the mobile display device, in some examples the display will be controlled according to a sleep mode.

In alternative implementations, other criteria may be used to determine whether a user is primarily viewing a second device that is capable of communication with the mobile display device instead of the mobile display device itself. For example, some implementations may involve receiving one or more indications that a user is interacting with a user interface of the second device. In some such examples, the second device may be a watch. The mobile display device may receive one or more indications that a user interface of the watch is receiving input, such as based on a user's touch. Some implementations wherein the second device is a watch may involve receiving inertial sensor data from the watch indicating that a user is rotating his or her wrist. This may be interpreted by the control system 410 as an indication that user is rotating his or her wrist in order to view the watch and that the display 210 may be controlled according to a low-power mode.

Other context-based implementations are disclosed herein. According to some such examples, a mobile display device may be capable of controlling a display based, at least in part, on the spectral power distribution of ambient light. Some light sources commonly used for indoor lighting have characteristic spectral power distributions, which may produce a yellowish white, a reddish white, a bluish white, etc. For example, the power distribution of a T8 fluorescent light includes multiple amplitude peaks in the visible range, with a maximum peak at approximately 550 nm. The power distribution of a mercury vapor light may include several narrow peaks, including peaks at approximately 405 nm, 435 nm, 545 nm and 580 nm, the highest-amplitude of which occurs at approximately 545 nm. There is no single spectral power distribution for natural daylight. Instead, the spectral power distribution may vary over time depending on various factors, including the amount of water vapor, dust, etc., in the atmosphere.

Figure 4D:
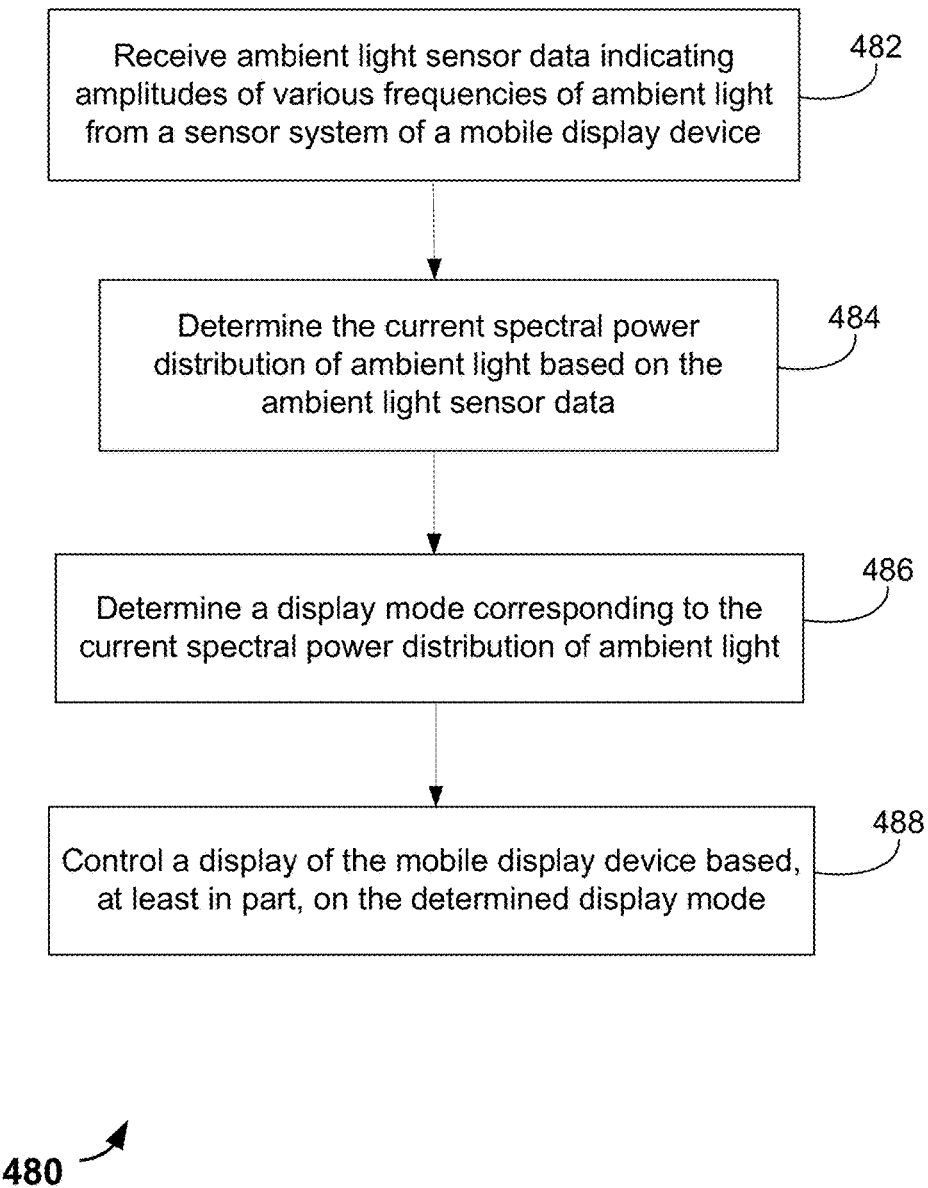
FIG. 4D is a flow diagram that outlines one example of a method for controlling display modes of a mobile display device based, at least in part, on the spectral power distribution of ambient light.

FIG. 4D is a flow diagram that outlines one example of a method for controlling display modes of a mobile display device based, at least in part, on the spectral power distribution of ambient light. The blocks of method 480, like other methods described herein, are not necessarily performed in the order indicated. Moreover, such methods may include more or fewer blocks than shown or described. In some implementations, the method 480 may be performed, at least in part, by a mobile display device control system, such as the control system 410 shown in FIG. 4A.

In this implementation, block 482 involves receiving, from a sensor system of a mobile display device, ambient light sensor data indicating the amplitudes of various frequencies of ambient light. The ambient light sensor data may vary according to the particular implementation. In some implementations, the sensor system may include a single, broadband ambient light sensor that is capable of determining the spectral power distribution of ambient light across the entire visible range and of providing corresponding broadband ambient light sensor data to a control system of the mobile display device. In some other implementations, the sensor system may include multiple narrow-band ambient light sensors, each of which is capable of determining, and providing narrow-band ambient light sensor data indicating, the spectral power distribution of ambient light across a portion of the visible range.

In this example, block 484 involves determining the current spectral power distribution of ambient light based on the ambient light sensor data. The process(es) of block 484 may vary according to the type of ambient light sensor data received in block 482. For example, the process may vary depending upon whether the ambient light sensor data received from the sensor system includes broadband or narrow-band ambient light sensor data.

Here, block 486 involves determining a display mode corresponding to the current spectral power distribution of ambient light. Block 486 may, in some implementations, involve querying a data structure that includes examples of spectral power distributions across the visible spectrum and corresponding display modes. The examples of spectral power distributions may, for example, include spectral power distributions of each of a plurality of light sources. In some implementations, the examples of spectral power distributions may include spectral power distributions for each of a plurality of outdoor ambient lighting conditions, such as bright sunlight, partial sunlight, high haze, low haze, high humidity, low humidity, light shade, dark shade, etc. According to some such examples, block 486 may involve comparing the current spectral power distribution of ambient light with the examples of spectral power distributions and determining the closest match.

According to some examples, if there is no clear match between the current spectral power distribution of ambient light and the examples of spectral power distributions, block 486 may involve determining a display mode according to an overall intensity of ambient light. For example, block 486 may involve summing the power in each of a plurality of spectral bands in the visible range. In some such examples, the display mode may be determined according to a hierarchy of display modes that are based, at least in part, on intensity of ambient light. The hierarchy may be as described elsewhere herein.

In this example, block 488 involves controlling a display of the mobile display device based, at least in part, on the display mode determined in block 486. In some implementations, block 488 may involve controlling the display based in part on one or more other factors, such as a software application being executed on the mobile display device. In one such example, a user may be using the camera functionality of the mobile display device and therefore the mobile display device may be executing a camera-related software application. Block 488 may involve controlling a display of the mobile display device according to display parameter settings that correspond with one or more of a high color depth setting, a high color gamut setting, a high frame rate, etc.

However, in some such examples, block 488 may involve changing a white point of the display according to the display mode determined in 486. Alternatively, or additionally, in some such examples, block 488 may involve controlling a gamma setting of the display according to the display mode determined in 486. In some such examples, the display mode determined in block 486 may include a relatively lower gamma setting when the current spectral power distribution of ambient light, or the overall intensity of ambient light, corresponds with a dark shade condition than when the current spectral power distribution of ambient light corresponds with a bright sunlight or a partial sunlight condition.

Still other context-based implementations are disclosed herein. According to some such implementations, a mobile display device may be capable of controlling a display based, at least in part, on one or more of time information, weather information and location information. For example, a mobile display device may be capable of controlling a display based on a light angle, a light intensity, or both, associated with a time of day. According to some such examples, if the display is not capable of operating as a reflective display, the display may need to be operated at a higher level of brightness when the sunlight angles are high, near noontime, as compared to during the morning or evening when light angles are lower. Although such examples may be implemented in mobile display devices that include ambient light sensors, such examples may be relatively more advantageous for mobile display devices that do not include ambient light sensors.

According to some implementations, a mobile display device may be capable of receiving weather information and controlling a display according to the weather information. For example, if the weather information indicates sunny conditions, the mobile display device may control the display according to a display mode that is suitable for bright ambient light, for example as described elsewhere herein. In some such implementations, local weather may vary significantly according to the microclimate of a particular location. For example, if the mobile display device receives location information indicating that the mobile display device is located in San Diego on a day that is forecast to be a foggy near the coastline and sunny inland, the mobile display device may control the display according to foggy conditions. However, if the mobile display device receives location information indicating that the mobile display device is located in El Cajon on the same day, the control system may determine that the display should be controlled according to sunny/bright ambient light conditions.

In some implementations, default display modes that are based on time of day, location, weather, etc., may be changed according to user preference. In some examples, default display modes may be changed according to user input received from a user input system of a mobile display device. An override of display mode based on user input may be advantageous because the assumptions upon which the default display modes are based, including but not limited to the ambient lighting conditions, may not always be correct.

Figure 5:
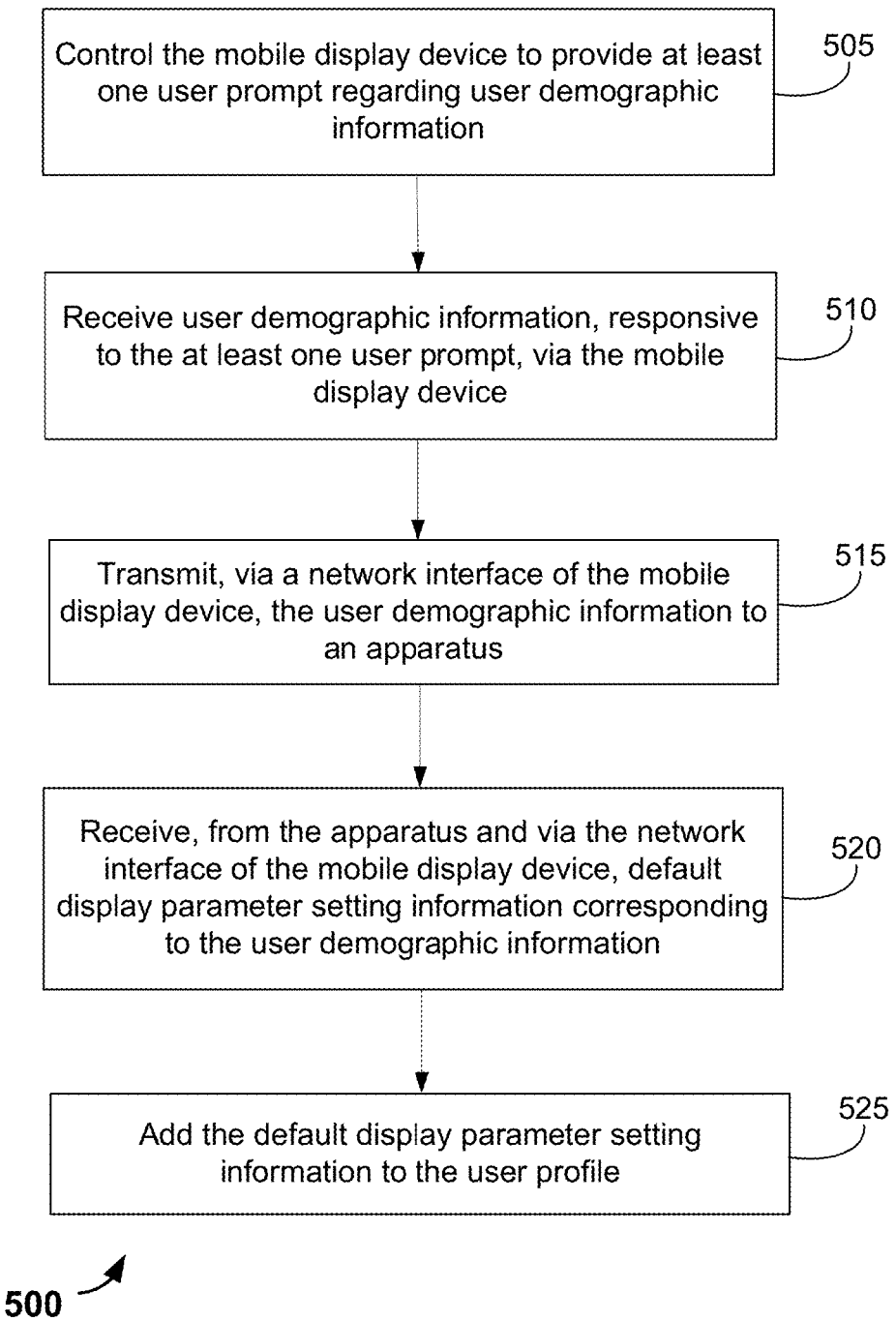
FIG. 5 is a flow diagram that outlines one example of a method for customizing display parameter settings of a mobile display device according to demographic information.

FIG. 5 is a flow diagram that outlines one example of a method for customizing display parameter settings of a mobile display device according to demographic information. The blocks of method 500, like other methods described herein, are not necessarily performed in the order indicated. Moreover, such methods may include more or fewer blocks than shown or described. In some implementations, method 500 may be performed, at least in part, by a mobile display device control system, such as the control system 410 shown in FIG. 4A.

In this implementation, block 505 of FIG. 5 involves controlling the mobile display device 200 to provide at least one user prompt regarding user demographic information. In some implementations, block 505 may involve controlling a display or an audio system of the mobile display device 200 to provide at least one user prompt for user demographic information. The user demographic information may, for example, include age, mobile display device usage information, etc. According to some examples, the mobile display device usage information may include an indication of whether the user primarily uses the mobile display device indoors or outdoors or other context-related information, such as the typical usage of software applications by a user demographic. In some implementations, the user may be presented with an option of not providing a substantive response, such as a "prefer not to answer" option.

In this example, block 510 involves receiving user demographic information, responsive to the at least one user prompt, via the mobile display device 200. For example, block 510 may involve receiving user demographic information via a user interface system such as the user interface system 405 shown in FIG. 4A.

Here, block 515 involves transmitting, via a network interface of the mobile display device 200, the user demographic information to another apparatus. In some implementations, the apparatus may be a remote device, such as a server. However, in alternative implementations, the apparatus may be another type of device, such as another mobile display device 200. The server, or another device, may, for example, have access to one or more data structures that include user demographic information and corresponding mobile display device setting information. For example, because human eye lenses tend to yellow with age and sun exposure, relatively older users may benefit from having relatively more blue in their display. Accordingly, in some implementations, a server may have access to a data structure that includes user age information and corresponding display parameter setting information, such as display color setting information.

Block 520 may involve receiving, from the apparatus and via the network interface of the mobile display device, display parameter setting information corresponding to the user demographic information. In this implementation, block 520 involves receiving default display parameter setting information. In some implementations, the default display parameter setting information may be applied unless such settings are in conflict with display parameter setting based on user preferences of a user currently using the mobile display device 200. Here, block 525 involves adding the default display parameter setting information to the user profile.

Figure 6:
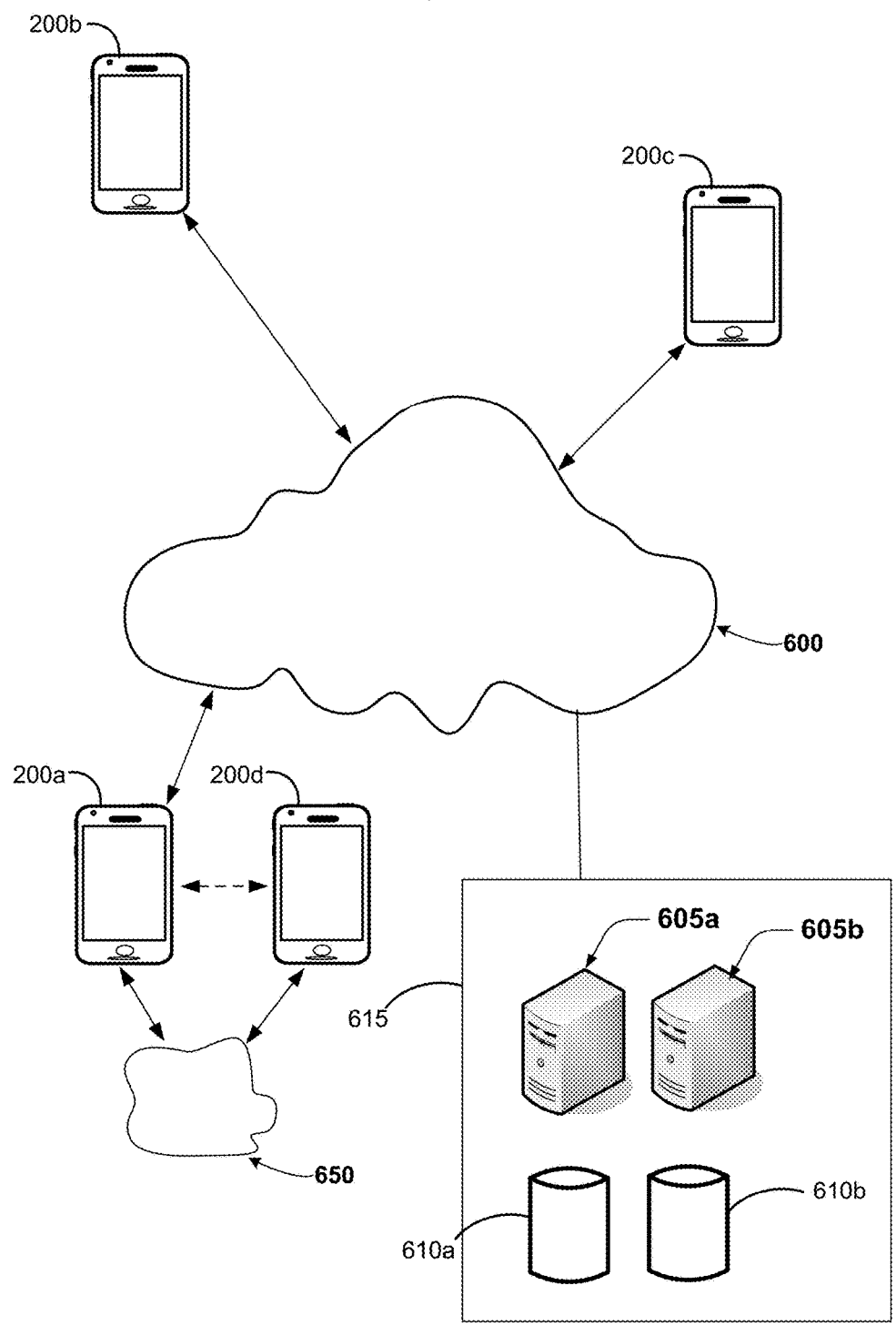
FIG. 6 shows an example of a network diagram.

FIG. 6 shows an example of a network diagram. The types and numbers of devices shown in FIG. 6 are merely examples. In this example, FIG. 6 shows mobile display devices 200a, 200b and 200c in communication with a data center 615 via a network cloud 600. The network cloud 600 may include one or more types of networks, such as one or more cellular telephone networks, the Internet, etc. In this example, the data center 615 includes the servers 605a and 605b, as well as the storage devices 610a and 610b. In some implementations, the server 605a or 605b may be capable of performing at least some methods disclosed herein.

According to some implementations, the server 605a or 605b may be capable of maintaining one or more data structures. The data structures may be stored in a memory system of the server 605a or 605b. Alternatively, or additionally, such data structures may be stored in the storage device 610a or 610b.

In some implementations, the data structures may include mobile display device types and corresponding display parameter settings, such as default display parameter settings. In some implementations, the server 605a or 605b may have access to user profile information or information from which user profile information may be determined. According to some such examples, the server 605a or 605b may be capable of maintaining the user profile information, updating the user profile information, etc.

The server 605a or 605b may, for example, have access to, and may be capable of maintaining, one or more data structures that include user demographic information and corresponding mobile display device setting information, such as display parameter setting information. Some such data structures may be organized, at least in part, according to user identification information, such as user identification codes. According to some implementations, the server 605a or 605b may be capable of maintaining versions of user profile information, such as according to a time interval such as a week, a month, a year, etc. For example, versions of user profile information may be saved for that time interval and archived. As noted above, various implementations disclosed herein involve creating user profile information over a period of time. In some instances, a user may not be content with a current state of a user profile and may wish to revert to a prior state, such as that of a previous week, month or year. Some such implementations allow a user to access a data structure corresponding to the prior state of the user profile, such as an archived version that is maintained by the server 605a or 605b.

In some implementations, the server 605a or 605b may have access to, and may be capable of maintaining, one or more data structures that may include updates or refinements of display parameter setting information. For example, the server 605a or 605b may update the display parameter setting information for particular display types as additional information becomes available regarding these display types. In some instances, the additional information may be obtained from mobile display device providers, such as mobile display device manufacturers. However, in some examples at least some of the additional information may be obtained by aggregating mobile display device setting information, such as display parameter setting information, from multiple user profiles.

Accordingly, having a "cloud-based" system that includes devices such as the server 605a or 605b can provide various potential advantages. For example, a cloud-based system may facilitate the global dissemination of updates or refinements of display parameter setting information, such as from a mobile display device provider to mobile display device users. A cloud-based system may reduce at least some of the storage or processing requirements associated with maintaining a user profile on a mobile display device 200. A cloud-based system may reduce the risk of losing user profile information when a mobile display device 200 is lost or stolen. A cloud-based system may facilitate the transfer of at least some user profile information obtained via one mobile display device 200 to another mobile display device 200, such as when a user obtains a different mobile display device 200.

According to some cloud-based examples, adding information to a user profile may involve transmitting, via a network interface of mobile display device 200a, 200b or 200c of FIG. 6, user profile information to the server 605a or 605b. Some cloud-based examples may involve mobile display device 200a, 200b or 200c receiving information from the server 605a or 605b. In some implementations, the information may include user profile information. Alternatively, or additionally, the information may include mobile display device setting information, such as display parameter setting information.

In some implementations, user profile information or mobile display device setting information may be transferred without transmitting data over a public network such as a cellular telephone network, the Internet, etc. In the example shown in FIG. 6, the mobile display device 200a is in the process of transmitting user profile information to the mobile display device 200d via a local network 650. In some examples, the mobile display device 200a and the mobile display device 200d may be capable of transferring such information directly, such as via a near-field communication communications protocol. Some users may prefer local or peer-to-peer data transfer methods, such as due to privacy concerns.

Figure 7:
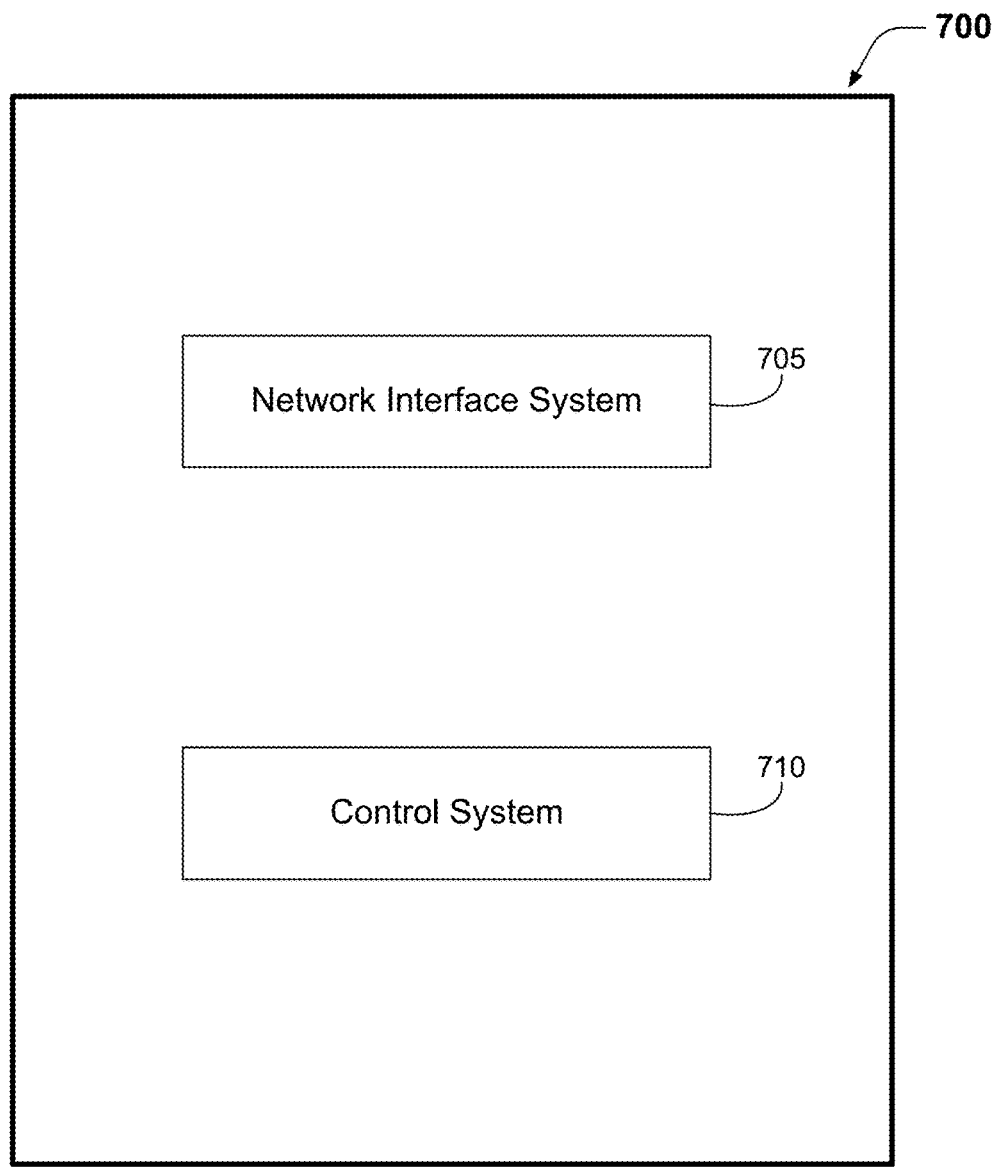
FIG. 7 is a block diagram that shows an alternative example of an apparatus.

FIG. 7 is a block diagram that shows an alternative example of an apparatus. In some implementations, the apparatus 700 may be a server. In this example, the apparatus 700 includes a network interface system 705, which includes one or more network interfaces. Here, the apparatus 700 includes a control system 710. The control system 710 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 710 also may include, or be configured for communication with, one or more memory devices, such as one or more random access memory (RAM) devices, read-only memory (ROM) devices, etc. The control system 710 may be capable of performing at least some methods disclosed herein.

Figure 8:
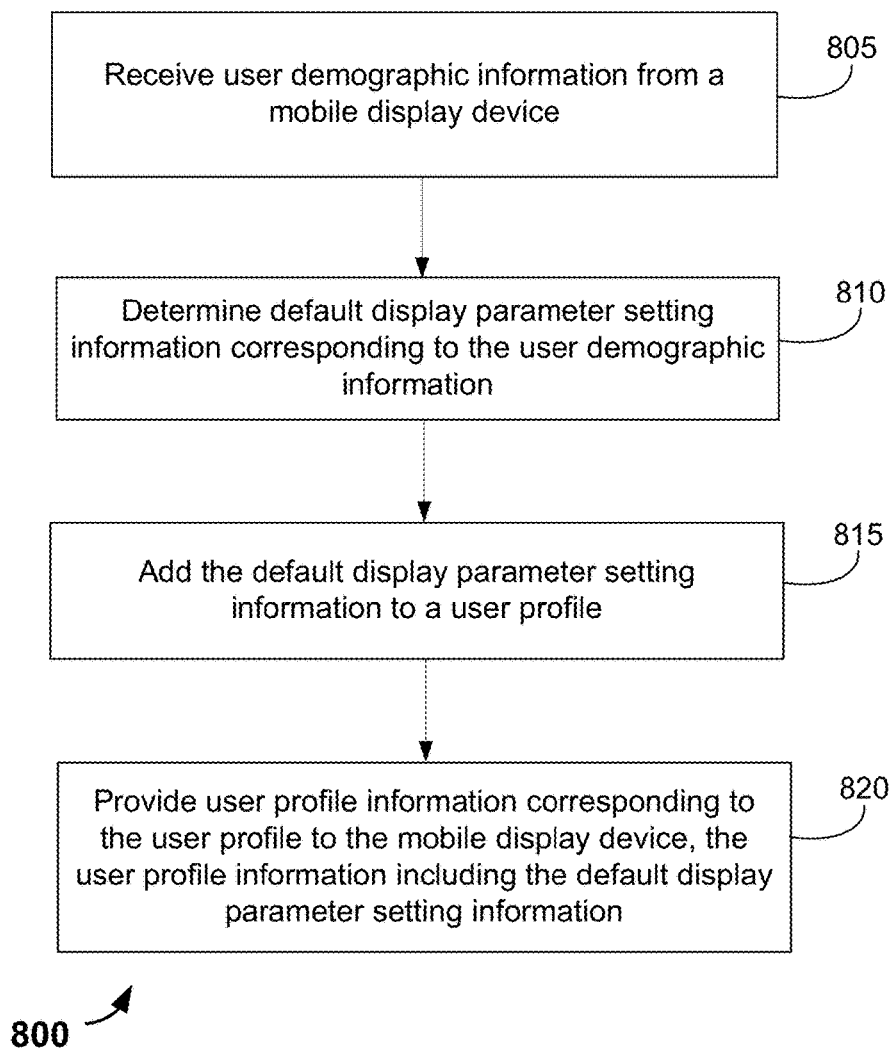
FIG. 8 is a flow diagram that provides example blocks of a method that may be performed by the apparatus of FIG. 7.

FIG. 8 is a flow diagram that provides example blocks of a method that may be performed by the apparatus of FIG. 7. The blocks of method 800, like other methods described herein, are not necessarily performed in the order indicated. Moreover, such methods may include more or fewer blocks than shown or described. In this implementation, block 805 involves receiving user demographic information, via a network interface, from a mobile display device 200. In some implementations, a server may receive the user demographic information in block 805. In alternative implementations, such as "peer-to-peer" implementations, another device, such as another mobile display device 200, may receive the user demographic information in block 805.

Here, block 810 involves determining default display parameter setting information corresponding to the user demographic information. In some implementations, the control system 710 of FIG. 7 may determine default display parameter setting information corresponding to the user demographic information in block 810. In some examples, block 810 may involve determining the default display parameter setting information by querying a data structure that includes default display parameter setting information and corresponding user demographic information, such as user age information.

In this example, block 815 involves adding the default display parameter setting information to a user profile. In some implementations, a server may add the default display parameter setting information to the user profile in block 815. In some examples, block 815 may be performed before block 810 is performed, or at substantially the same time that block 810 is performed.

In this implementation, block 820 involves providing user profile information corresponding to the user profile, via the network interface, to the mobile display device 200. Here, the user profile information includes the default display parameter setting information determined in block 810.

Various other methods may be performed, at least in part, by the apparatus of FIG. 7. For example, the control system 710 may be capable of receiving user preference data, via the network interface system 705, from a mobile display device 200. The control system 710 may be capable of determining display parameter setting information for the mobile display device 200 corresponding to the user preference data and of transmitting the display parameter setting information, via the network interface system 705, to the mobile display device 200.

In some implementations, the control system 710 may be capable of providing to the mobile display device 200, via the network interface system 705, a hierarchy of criteria for controlling a display of the mobile display device 200. The hierarchy of criteria may, for example, include battery state, luminance of ambient light or ambient temperature.

In some examples, the control system 710 may be capable of receiving, via the network interface system 705, an indication of a software application that is currently being executed by the mobile display device 200. The control system 710 may be capable of transmitting, via the network interface system 705, information for controlling a display of the mobile display device 200 based, at least in part, on the software application.

In some implementations, the control system 710 may be capable of receiving, via the network interface system 705, an indication that a plurality of software applications is currently being executed by a mobile display device 200. The control system 710 may be capable of determining display mode information for controlling a display 210 of the mobile display device 200. In some examples, the display mode information may be based, at least in part, on a hierarchy of display modes. The control system 710 may be capable of transmitting, via the network interface system 705, the display mode information to the mobile display device 200.

Figure 9:
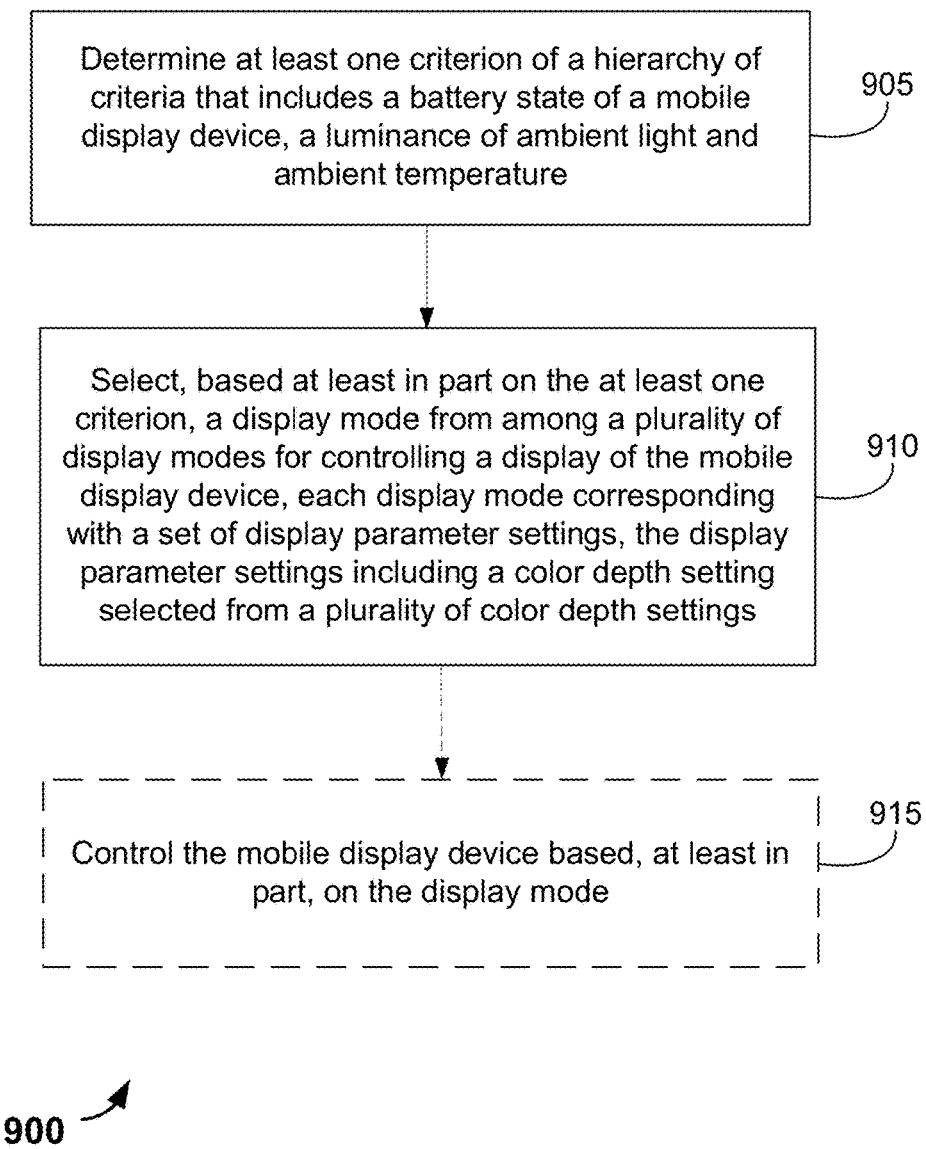
FIG. 9 is a flow diagram that shows an example of selecting a display mode at least in part according to a hierarchy of criteria.

FIG. 9 is a flow diagram that shows an example of selecting a display mode at least in part according to a hierarchy of criteria. The blocks of method 900, like other methods described herein, are not necessarily performed in the order indicated. Moreover, such methods may include more or fewer blocks than shown or described.

Some or all of the methods described herein, including but not limited to method 900 and method 1000 of FIG. 10 (described below), may be performed by one or more devices according to instructions, which may be implemented via software stored on non-transitory media. Such non-transitory media may include memory devices such as those described herein, including but not limited to random access memory (RAM) devices, read-only memory (ROM) devices, etc. In some implementations, operations corresponding to such instructions may be performed, at least in part, by a mobile display device 200. Alternatively, or additionally, operations corresponding to such instructions may be performed, at least in part, by an apparatus 700, such as a server.

In the implementation shown in FIG. 9, block 905 involves determining at least one criterion of a hierarchy of criteria. In this example, the hierarchy of criteria includes a battery state of a mobile display device 200, a luminance of ambient light and ambient temperature. According to some such implementations, block 905 may involve receiving input from a sensor system of a mobile display device 200, such as the sensor system 1179 shown in FIG. 11B and described below. Block 905 may involve determining a battery state, such as a state of one or more components of the power supply 1150 that is shown in FIG. 11B.

In this instance, block 910 involves selecting, based at least in part on at least one criterion, a display mode from among a plurality of display modes for controlling a display of the mobile display device 200. Here, each display mode corresponds with a set of display parameter settings. The display parameter settings may include a color depth setting selected from a plurality of color depth settings. In some implementations, each of the color depth settings may correspond to a number of bits used to specify the color depth setting. The display parameter settings may include, or may indicate, a display light illumination setting. The display light illumination setting may correspond with a brightness setting of a display light, such as the display light 1133 shown in FIG. 11B. The display light illumination setting may be selected from plurality of display light illumination settings.

Subsequent operations, if any, may vary. In some instances a subsequent operation may depend, at least in part, on what device has performed the previous operations. For example, if a server has performed block 910, a subsequent operation may involve transmitting an indication of the selected display mode to a mobile display device 200. In this example, optional block 915 involves controlling a mobile display device 200 based, at least in part, on the display mode.

Figure 10:
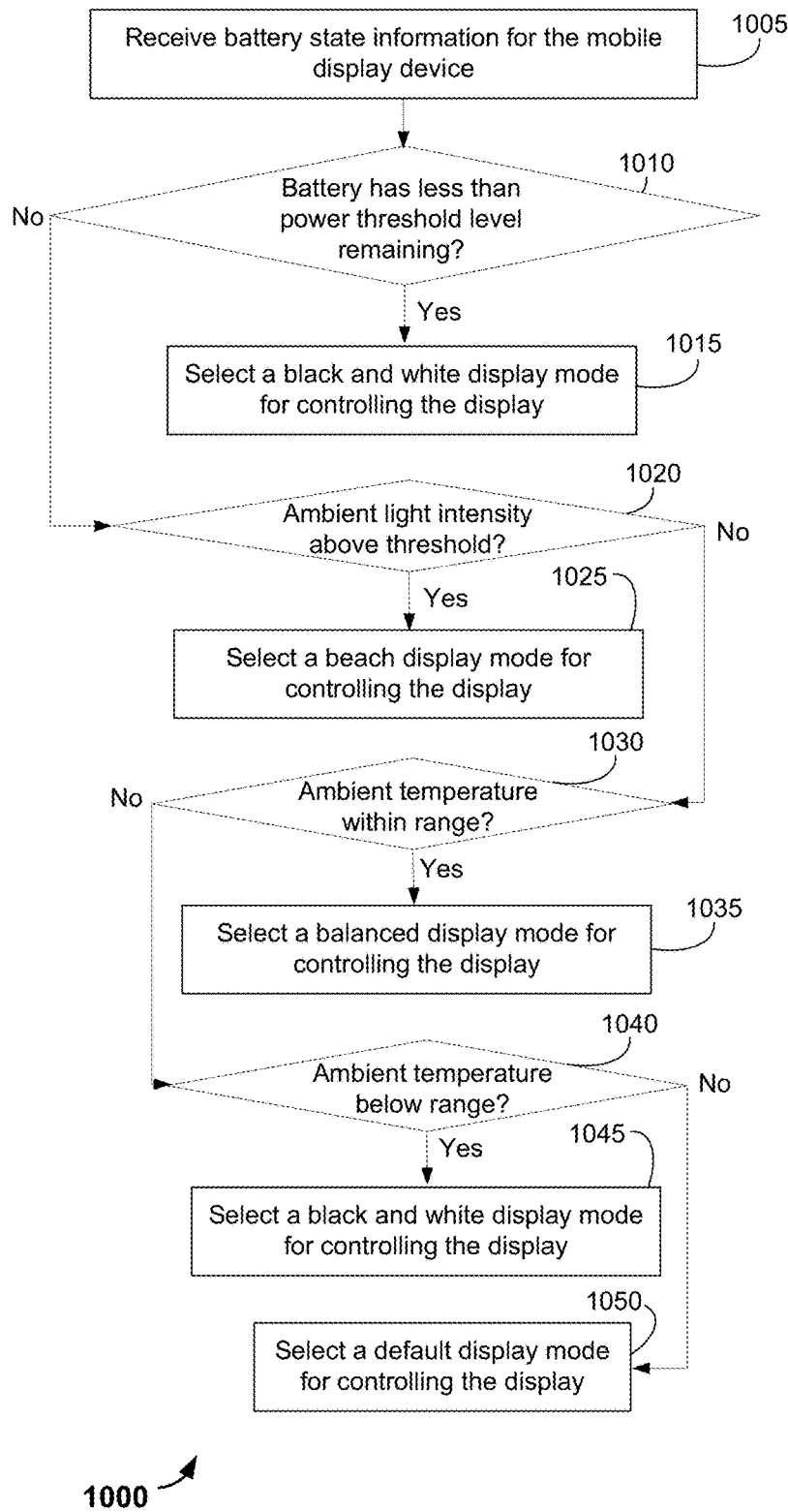
FIG. 10 is a flow diagram that shows an alternative example of selecting a display mode at least in part according to a hierarchy of criteria.

FIG. 10 is a flow diagram that shows an alternative example of selecting a display mode at least in part according to a hierarchy of criteria. The blocks of method 1000, like other methods described herein, are not necessarily performed in the order indicated. Moreover, such methods may include more or fewer blocks than shown or described. In some implementations the blocks of method 1000 may be performed, at least in part, by a mobile display device 200 or by an apparatus 700, such as a server.

In this example, block 1005 involves receiving battery state information for the mobile display device 200. In some examples, the control system 410 of the mobile display device 200 may receive the battery state information from a battery of the mobile display device 200 in block 1005. Alternatively, or additionally, the control system 710 of the apparatus 700 may receive the battery state information via the network interface system 705 in block 1005.

In this implementation, block 1010 involves determining whether the battery state information indicates that the battery has less than a power threshold level remaining. The power threshold level may, for example, be 5% of a battery's power, 10%, 15%, or another percentage of the battery's power. In some implementations, the power threshold level may be selectable by a user. In some implementations the power threshold level may be determined, at least in part, by information in a user profile. For example, the user profile information, which may or may not be calibrated to aggregate profile information available in the cloud, may indicate that the user greatly prefers longer battery life, and therefore the power threshold level may be set at a relatively high level, such as 25%.

In this example, if it is determined in block 1010 that the battery has less than a power threshold level remaining, a non-color or "black and white" display mode is selected in block 1015 in order to reduce power consumption. A display of the mobile display device may be controlled in accordance with the selected display mode. However, if it is determined in block 1010 that the battery does not have less than a power threshold level remaining, an ambient light intensity level may be determined. In some implementations, a display mode for controlling the display may be selected based, at least in part, on the ambient light intensity level.

In the example shown in FIG. 10, if it is determined in block 1010 that the battery does not have less than a power threshold level remaining, the process continues to block 1020. Here, block 1020 involves determining whether an ambient light intensity level is greater than an ambient light intensity level threshold. In some implementations, the ambient light intensity level threshold may correspond with an expected ambient light intensity level when the mobile display device is being used outdoors on a sunny day. In some such examples, the ambient light intensity level threshold may be in the range of 32,000 to 100,000 lux. In alternative examples, the ambient light intensity level threshold may correspond with an expected ambient light intensity level when the mobile display device is being used in full daylight, but not in direct sunlight. In some such examples, the ambient light intensity level threshold may be in the range of 10,000 to 25,000 lux.

In this example, if it is determined in block 1020 that the ambient light intensity level is greater than the ambient light intensity level threshold, a "beach" display mode is selected in block 1025. In some implementations, the beach display mode may correspond with a relatively high level of display light illumination, in order to compensate for the high ambient light intensity level. In alternative implementations, such as implementations in which the display of the mobile display device 200 is a reflective or transflective display, the display light may be switched off during beach display operation. In some implementations, the beach display mode may correspond with a relatively low color depth setting, such as an 8-bit color depth setting.

In this example, if it is determined in block 1020 that the ambient light intensity level is not greater than the ambient light intensity level threshold, the process continues to block 1030. Here, block 1030 involves determining whether an ambient temperature is within an ambient temperature range, which may be a predetermined ambient temperature range or a user-selected ambient temperature range. In some implementations, the ambient temperature range may be a temperature range that is near the freezing temperature of water. For example, in some such implementations the ambient temperature range may include the freezing temperature of water. For example, in some implementations the ambient temperature range may be −15 degrees Celsius to 15 degrees Celsius, −10 degrees Celsius to 10 degrees Celsius, −5 degrees Celsius to 5 degrees Celsius, etc. However, in other implementations the ambient temperature range may be significantly above or below the freezing temperature of water.

In this example, if it is determined in block 1030 that the ambient temperature is within the ambient temperature range, a "balanced" display mode is selected in block 1035. In some implementations, the balanced display mode may correspond with or indicate a moderate level of display light illumination and a color depth setting in a low-to-moderate range of color depth settings. In some such examples, the balanced display mode may have more color depth than the beach display mode. In some such examples, the balanced display mode may correspond with a 16-bit color depth.

In this example, if it is determined in block 1030 that the ambient temperature is not within the ambient temperature range, the process continues to block 1040 wherein it is determined whether the ambient temperature is below the ambient temperature range. In this implementation, if it is determined in block 1040 that the ambient temperature is below the ambient temperature range, a black and white display mode is selected in block 1045.

However, if it is determined in block 1040 that the ambient temperature is not below the ambient temperature range, in this example a default display mode is selected in block 1050. In some implementations, the default display mode may correspond with, or indicate, a moderate level of display light illumination and a relatively high color depth setting. In some such examples, the default display mode may correspond with, or indicate, a 24-bit color depth setting.

Various other examples of selecting a display mode at least in part according to a hierarchy of criteria are within the scope of the present disclosure. Whereas in some foregoing examples the hierarchy of criteria includes a battery state of a mobile display device 200, a luminance of ambient light and ambient temperature, other examples may involve different criteria, such as a type of content being displayed on the mobile display device 200, a type of software application being executed on the mobile display device 200, etc. In some implementations, a default display mode may be selected, at least in part, according to a hierarchy of criteria, but a user preference may be given higher weight than a default display mode. For example, if a user preference indicates a first set of display parameter settings and a hierarchy of criteria indicates a second set of display parameter settings, in some implementations a display mode corresponding with the first set of display parameter settings may be selected. In some such examples, the user preference may be indicated in a user profile.

According to some implementations, thresholds for transitioning between levels of a hierarchy of display modes or display mode parameters corresponding to hierarchical levels may be based, at least in part, on aggregated user information. As noted above, some implementations may involve a "cloud-based" system such as that described above with reference to FIG. 6. Some such implementations may involve maintaining user information, which may include information regarding trade-offs between display parameter settings and corresponding power consumption levels. In some examples, user information for multiple users may be aggregated. For example, the aggregated user information may indicate that the average user would find a 20-bit color depth and a 200 nit display brightness setting to be acceptable with a battery state corresponding to 33% of battery life remaining. Some implementations may involve updating a display mode of a hierarchical level for a corresponding battery state to include a 20-bit color depth and 200 nit display brightness setting. Alternatively, or additionally, implementations may involve updating a criterion for transitioning from one 24 bit, 500 nit hierarchical level to another 20 bit, 200 nit level such that a transition occurs when battery life drops to 33%. For example, a server such as the server 605a or 605b shown in FIG. 6 may update the display parameter setting information corresponding to a display mode of a hierarchical level or one or more criteria for transitioning from one hierarchical level to another. Such updates may, for example, be distributed to multiple mobile display devices 200 via one or more networks.

According to some such implementations, display modes or criteria for transitioning between hierarchical levels may be based on classes of aggregated user preferences. Some such examples may involve determining and applying one set of display modes or criteria for transitioning between hierarchical levels for average users and another set for videophiles.

Figure 11A:
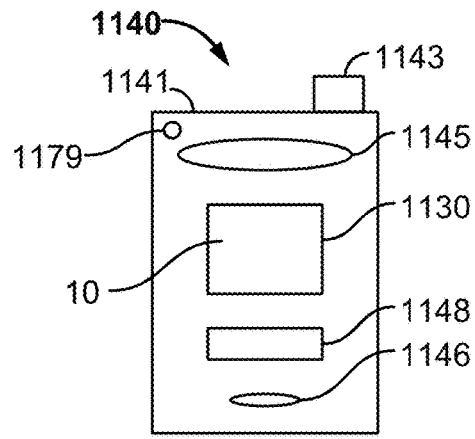
FIGS. 11A and 11B show examples of system block diagrams illustrating example components of a display device.
Figure 11B:
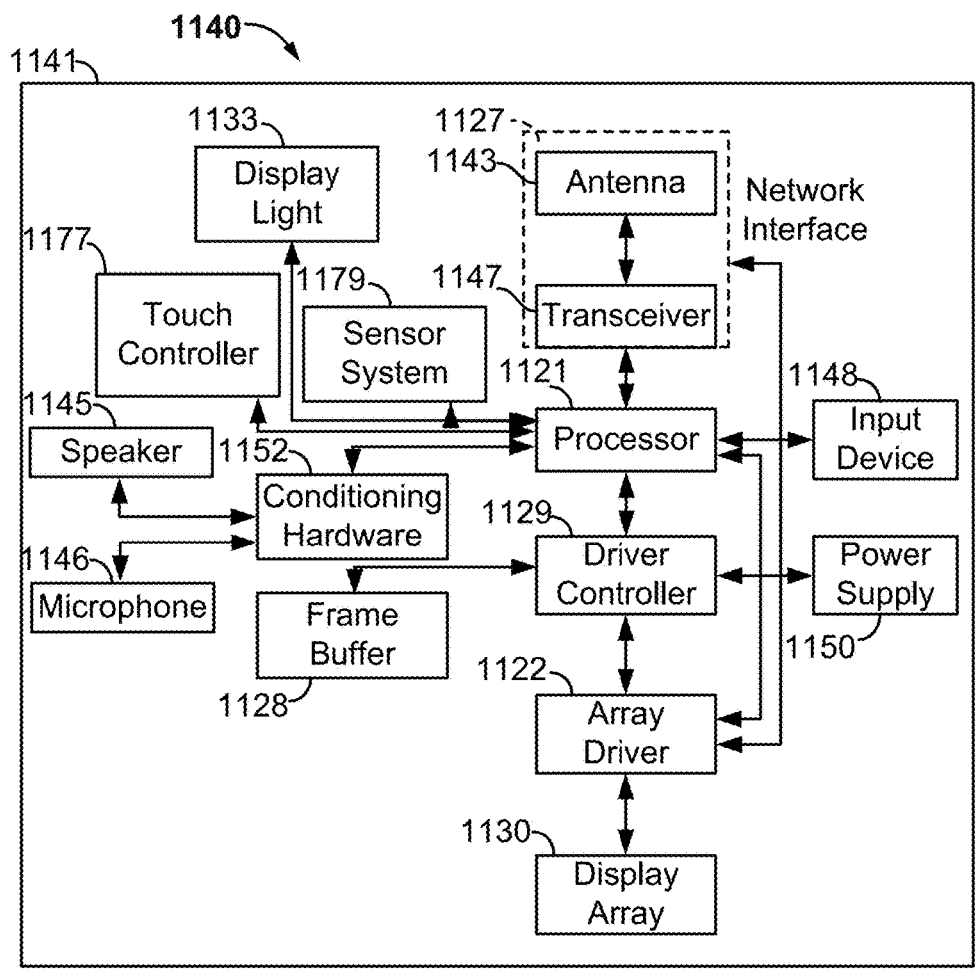

FIGS. 11A and 11B show examples of system block diagrams illustrating example components of a display device. The display device 1140 may, for example, be a mobile display device 200 such as a smart phone, a cellular or mobile telephone, etc. However, the same components of the display device 1140 or slight variations thereof are also illustrative of various types of display devices such as televisions, computers, tablets, e-readers, hand-held devices and portable media devices.

In this example, the display device 1140 includes a housing 1141, a display array 1130, a touch sensing system 10, an antenna 1143, a speaker 1145, an input device 1148 and a microphone 1146. The housing 1141 may be formed from any of a variety of manufacturing processes, including injection molding, and vacuum forming. In addition, the housing 1141 may be made from any of a variety of materials, including, but not limited to: plastic, metal, glass, rubber and ceramic, or a combination thereof. The housing 1141 may include removable portions (not shown) that may be interchanged with other removable portions of different color, or containing different logos, pictures, or symbols.

The display array 1130 may be any of a variety of displays, including a flat-panel display, such as plasma, organic light-emitting diode (OLED) or liquid crystal display (LCD), or a non-flat-panel display, such as a cathode ray tube (CRT) or other tube device. In addition, the display array 1130 may include an interferometric modulator (IMOD)-based display or a micro-shutter based display.

In this example, the display device 1140 includes a sensor system 1179. In some implementations, the sensor system 1179 may include one or more ambient light sensors, inertial sensors or temperature sensors. The inertial sensor(s), if present, may include one or more gyroscopes, accelerometers, etc. In some examples, the sensor system 1179 may include one or more sensors that are capable of determining the amplitudes of various frequencies of light in the visible spectrum. In some implementations, the sensor system may provide ambient light intensity data or temperature data for input to a process of selecting a display mode such as that of method 900 or method 1000, which are described above with reference to FIGS. 9 and 10. In this example, the display device 1140 includes a display light 1133, the brightness of which may correspond with a selected display mode.

The components of one example of the display device 1140 are schematically illustrated in FIG. 11B. Here, the display device 1140 includes a housing 1141 and may include additional components at least partially enclosed therein. For example, the display device 1140 includes a network interface 1127 that includes an antenna 1143 which may be coupled to a transceiver 1147. The network interface 1127 may be a source for image data that could be displayed on the display device 1140. Accordingly, the network interface 1127 is one example of an image source module, but the processor 1121 and the input device 1148 also may serve as an image source module. The transceiver 1147 is connected to a processor 1121, which is connected to conditioning hardware 1152. The conditioning hardware 1152 may be capable of conditioning a signal, for example by applying a filter or otherwise manipulating a signal. The conditioning hardware 1152 may be connected to a speaker 1145 and a microphone 1146. The processor 1121 also may be connected to an input device 1148 and a driver controller 1129. The driver controller 1129 may be coupled to a frame buffer 1128, and to an array driver 1122, which in turn may be coupled to a display array 1130. One or more elements in the display device 1140, including elements not specifically depicted in FIG. 11B, may be capable of functioning as a memory device and be capable of communicating with the processor 1121 or other components of a control system. In some implementations, a power supply 1150 may provide power to substantially all components in the particular display device 1140 design.

In this example, the display device 1140 also includes a touch controller 1177. The touch controller 1177 may, for example, be a part of a control system 410 such as that described above. Accordingly, in some implementations the touch controller 1177, or other components of the control system 410, may include one or more memory devices. In some implementations, the control system 410 also may include components such as the processor 1121, the array driver 1122 or the driver controller 1129 shown in FIG. 11B. The touch controller 1177 may be capable of communicating with elements of the touch sensing system 10 (such as with elements of a touch screen), for example by routing wires, and may be capable of controlling the touch sensing system 10. The touch controller 1177 may be capable of determining a location or movement of one or more objects, such as fingers, on or proximate the touch sensing system 10. In alternative implementations, however, the processor 1121, or another part of the control system 410, may be capable of providing some or all of this functionality.

The touch controller 1177, or another element of the control system 50, may be capable of providing input for controlling the display device 1140 according to one or more touch locations. In some implementations, the touch controller 1177 may be capable of determining movements of one or more touch locations and of providing input for controlling the display device 1140 according to the movements. Alternatively, or additionally, the touch controller 1177 may be capable of determining locations or movements of objects that are proximate the display device 1140. Accordingly, in some implementations the touch controller 1177 may be capable of detecting finger or stylus movements, hand gestures, etc., even if no contact is made with the display device 1140. The touch controller 1177 may be capable of providing input for controlling the display device 1140 according to such detected movements or gestures.

The network interface 1127 includes the antenna 1143 and the transceiver 1147 so that the display device 1140 may communicate with one or more devices over a network. The network interface 1127 also may have some processing capabilities to relieve, for example, data processing requirements of the processor 1121. The antenna 1143 may transmit and receive signals. In some implementations, the antenna 1143 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 1143 transmits and receives RF signals according to the Bluetooth® standard. In the case of a cellular telephone, the antenna 1143 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 1147 may pre-process the signals received from the antenna 1143 so that they may be received by and further manipulated by the processor 1121. The transceiver 1147 also may process signals received from the processor 1121 so that they may be transmitted from the display device 1140 via the antenna 1143.

In some implementations, the transceiver 1147 may be replaced by a receiver. In addition, in some implementations, the network interface 1127 may be replaced by an image source, which may store or generate image data to be sent to the processor 1121. The processor 1121 may control the overall operation of the display device 1140. The processor 1121 receives data, such as compressed image data from the network interface 1127 or an image source, and processes the data into raw image data or into a format that may be readily processed into raw image data. The processor 1121 may send the processed data to the driver controller 1129 or to the frame buffer 1128 for storage. Raw data typically refers to the information that identifies the image characteristics at each location within an image. For example, such image characteristics may include color, saturation and gray-scale level.

The processor 1121 may include a microcontroller, CPU, or logic unit to control operation of the display device 1140. The conditioning hardware 1152 may include amplifiers and filters for transmitting signals to the speaker 1145, and for receiving signals from the microphone 1146. The conditioning hardware 1152 may be discrete components within the display device 1140, or may be incorporated within the processor 1121 or other components.

The driver controller 1129 may take the raw image data generated by the processor 1121 either directly from the processor 1121 or from the frame buffer 1128 and may re-format the raw image data appropriately for high speed transmission to the array driver 1122. In some implementations, the driver controller 1129 may re-format the raw image data into a data flow having a raster-like format, such that it has a time order suitable for scanning across the display array 1130. Then the driver controller 1129 sends the formatted information to the array driver 1122. Although a driver controller 1129, such as an LCD controller, is often associated with the system processor 1121 as a stand-alone Integrated Circuit (IC), such controllers may be implemented in many ways. For example, controllers may be embedded in the processor 1121 as hardware, embedded in the processor 1121 as software, or fully integrated in hardware with the array driver 1122.

The array driver 1122 may receive the formatted information from the driver controller 1129 and may re-format the video data into a parallel set of waveforms that are applied many times per second to the hundreds, and sometimes thousands (or more), of leads coming from the display's x-y matrix of display elements.

In some implementations, the driver controller 1129, the array driver 1122, and the display array 1130 are appropriate for any of the types of displays described herein. For example, the driver controller 1129 may be a conventional display controller or a bi-stable display controller, such as an IMOD display element controller. Additionally, the array driver 1122 may be a conventional driver or a bi-stable display driver. Moreover, the display array 1130 may be a conventional display array or a bi-stable display. In some implementations, the driver controller 1129 may be integrated with the array driver 1122. Such an implementation may be useful in highly integrated systems, for example, mobile phones, portable-electronic devices, watches or small-area displays.

In some implementations, the input device 1148 may be capable of allowing, for example, a user to control the operation of the display device 1140. The input device 1148 may include a keypad, such as a QWERTY keyboard or a telephone keypad, a button, a switch, a rocker, a touch-sensitive screen, a touch-sensitive screen integrated with the display array 1130, or a pressure- or heat-sensitive membrane. The microphone 1146 may be capable of functioning as an input device for the display device 1140. In some implementations, voice commands through the microphone 1146 may be used for controlling operations of the display device 1140.

The power supply 1150 may include a variety of energy storage devices. For example, the power supply 1150 may be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery may be wirelessly chargeable. The power supply 1150 also may be a renewable energy source, a capacitor, or a solar cell, including a plastic solar cell or solar-cell paint. The power supply 1150 also may be capable of receiving power from a wall outlet.

In some implementations, control programmability resides in the driver controller 1129 which may be located in several places in the electronic display system. In some other implementations, control programmability resides in the array driver 1122. The above-described optimization may be implemented in any number of hardware or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of customizing display settings of a mobile display device, comprising:
controlling the mobile display device to provide at least one prompt for preference data, including at least one prompt for a selection among multiple scenarios involving trade-offs between display parameter settings and corresponding power consumption levels;
receiving the preference data via the mobile display device;
adding the preference data to a profile; and
controlling a display of the mobile display device, at least in part, according to the profile, wherein the display parameter settings include color depth settings, each of the color depth settings corresponding to a number of bits used to specify a color depth setting.

2. The method of claim 1, further comprising:
controlling the display of the mobile display device to provide at least one prompt for a visual performance test;
receiving visual performance data, responsive to the at least one prompt, via the mobile display device; and
adding the visual performance data to the profile.

3. The method of claim 2, wherein the visual performance test involves testing for at least one acuity type selected from a list of acuity types consisting of color brightness acuity and dithering technique acuity.

4. The method of claim 1, further comprising:
controlling the mobile display device to provide at least one prompt regarding demographic information;
receiving demographic information, responsive to the at least one prompt, via the mobile display device;
transmitting, via a network interface of the mobile display device, the demographic information to an apparatus;
receiving, from the apparatus and via the network interface of the mobile display device, default display parameter setting information corresponding to the demographic information; and
adding the default display parameter setting information to the profile.

5. The method of claim 1, wherein adding information to the profile involves transmitting, via a network interface of the mobile display device, profile information to a server.

6. The method of claim 1, further comprising controlling the display of the mobile display device according to a hierarchy of criteria, the hierarchy of criteria consisting of at least one criterion selected from a group of criteria that includes battery state, luminance of ambient light and ambient temperature.

7. The method of claim 1, further comprising:
determining a software application that is currently being executed by the mobile display device; and
controlling the display of the mobile display device based, at least in part, on the software application.

8. The method of claim 1, further comprising:
determining that a plurality of software applications is currently being executed by the mobile display device; and
determining a display mode for the display of the mobile display device based, at least in part, on a hierarchy of display modes.

9. A mobile display device, comprising:
a display;
a user interface system;
a network interface; and
a control system capable of:
controlling the display to provide at least one prompt for preference data, including at least one prompt for a selection among multiple scenarios involving trade-offs between display parameter settings and corresponding power consumption levels;
receiving the preference data via the user interface system;
adding the preference data to a profile; and
controlling the display, at least in part, according to the profile, wherein the control system is further capable of:
controlling the mobile display device to provide at least one prompt regarding demographic information;
receiving demographic information, responsive to the at least one prompt, via the user interface system;
transmitting, via the network interface, the demographic information to an apparatus;
receiving, from the apparatus and via the network interface of the mobile display device, default display parameter setting information corresponding to the demographic information; and
adding the default display parameter setting information to the profile.

10. The mobile display device of claim 9, wherein the control system is capable of:
controlling the display to provide at least one prompt for a visual performance test;
receiving visual performance data, responsive to the at least one prompt; and
adding the visual performance data to the profile.

11. The mobile display device of claim 10, wherein the control system is capable of controlling the mobile display device to enter a battery saving mode based at least in part on at least one type of data selected from a group of data types consisting of the visual performance data and the preference data.

12. The mobile display device of claim 10, wherein the control system is capable of controlling the mobile display device to enter a visually compensatory mode based on the visual performance data.

13. The mobile display device of claim 9, wherein the mobile display device includes a network interface and wherein the control system is capable of:
transmitting, via the network interface, preference data to an apparatus;
receiving, from the apparatus and via the network interface, display parameter setting information corresponding to the preference data; and controlling the display according to the display parameter setting information.

14. The mobile display device of claim 9, wherein the control system is capable of receiving, via a network interface of the mobile display device, profile information from a server.

15. The mobile display device of claim 9, wherein the control system is capable of controlling the display according to a hierarchy of criteria, the hierarchy of criteria consisting of at least one criterion selected from a group of criteria consisting of battery state, luminance of ambient light, ambient temperature, and information in the profile.

16. The mobile display device of claim 9, wherein the control system is capable of:
   determining that a plurality of software applications is currently being executed by the mobile display device; and
   determining a display mode for the display of the mobile display device based, at least in part, on a hierarchy of display modes.

17. An apparatus, comprising:
   a network interface system; and
   a control system capable of:
      receiving demographic information, via the network interface, from a mobile display device;
      determining default display parameter setting information corresponding to the demographic information;
      adding the default display parameter setting information to a profile; and
      providing profile information corresponding to the profile, via the network interface, to the mobile display device, the profile information including the default display parameter setting information; wherein the control system is further capable of:
      receiving, via the network interface system, an indication that a plurality of software applications is currently being executed by the mobile display device;
      determining display mode information for controlling a display of the mobile display device based, at least in part, on a hierarchy of display modes; and
      transmitting, via the network interface system, the display mode information to the mobile display device.

18. The apparatus of claim 17, wherein the control system is capable of:
   receiving preference data, via the network interface system, from a mobile display device;
   determining display parameter setting information for the mobile display device corresponding to the preference data; and
   transmitting the display parameter setting information, via the network interface system, to the mobile display device.

19. The apparatus of claim 17, wherein the control system is capable of providing to the mobile display device, via the network interface system, a hierarchy of criteria for controlling a display of the mobile display device, the hierarchy of criteria consisting of at least one criterion selected from a group of criteria that includes battery state, luminance of ambient light and ambient temperature.

20. The apparatus of claim 17, wherein the control system is capable of:
   receiving, via the network interface system, an indication of a software application that is currently being executed by the mobile display device; and
   transmitting, via the network interface system, information for controlling a display of the mobile display device based, at least in part, on the software application.

21. A non-transitory medium having software stored thereon, the software including instructions for controlling at least one device to:
   determine at least one criterion of a hierarchy of criteria that includes a battery state of a mobile display device, a luminance of ambient light and ambient temperature; and
   select, based at least in part on the at least one criterion, a display mode from among a plurality of display modes for controlling a display of the mobile display device, each display mode corresponding with a set of display parameter settings, the display parameter settings including a color depth setting selected from a plurality of color depth settings, wherein determining the at least one criterion of the hierarchy of criteria involves receiving battery state information for the mobile display device and wherein the software further includes instructions for controlling at least one device to:
   determine whether the battery state information indicates that the battery has less than a power threshold level remaining; and, if the battery state indicates that the battery has less than the power threshold level remaining,
   select a black and white display mode for controlling the display.

22. The non-transitory medium of claim 21, wherein each display mode indicates a display light illumination setting selected from plurality of display light illumination settings.

23. The non-transitory medium of claim 21, wherein the hierarchy of criteria includes at least one criterion selected from a group of criteria consisting of a spectral content of ambient light, inertial sensor data and a software application that is currently being executed by the mobile display device.

24. The non-transitory medium of claim 21, wherein the hierarchy of criteria includes a context in which the mobile display device is being used, the context including at least one context selected from a list of contexts consisting of a current usage of a software application, a motion-based context that is based, at least in part, on inertial sensor data and a context in which the mobile display device is being used in cooperation with a second device.

25. The non-transitory medium of claim 24, wherein the context involves a current usage of a software application, wherein the software application has two or more corresponding sets of display parameter settings and wherein each of the sets of display parameter settings depends, at least in part, on the current usage of the software application.

26. The non-transitory medium of claim 24, wherein the context involves the mobile display device being used in cooperation with a second device and wherein the second device is a wearable device selected from a group of wearable devices consisting of a watch and a wearable medical device.

* * * * *